US008544209B2

(12) United States Patent
Aschmutat et al.

(10) Patent No.: US 8,544,209 B2
(45) Date of Patent: Oct. 1, 2013

(54) WINDOW LIFTER ASSEMBLY

(75) Inventors: Raimund Aschmutat, Grub am Forst (DE); Gabriele Lange, Marktrodach (DE); Olaf Kriese, Coburg (DE); Thomas Salhoff, Hallstadt (DE); Werner Stammberger, Grub am Forst (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/131,843

(22) PCT Filed: Nov. 25, 2009

(86) PCT No.: PCT/EP2009/065840
§ 371 (c)(1),
(2), (4) Date: May 27, 2011

(87) PCT Pub. No.: WO2010/063628
PCT Pub. Date: Jun. 10, 2010

(65) Prior Publication Data

US 2011/0225888 A1 Sep. 22, 2011

(30) Foreign Application Priority Data

Dec. 1, 2008 (DE) ......................... 10 2008 060 407

(51) Int. Cl.
*B60J 5/04* (2006.01)

(52) U.S. Cl.
USPC ............................................... 49/375; 49/352

(58) Field of Classification Search
USPC .................. 49/348, 349, 352, 372, 374, 375, 49/506
See application file for complete search history.

(56) References Cited

U.S. PATENT DOCUMENTS 5,351,443 A 10/1994 Kimura et al.
5,692,273 A * 12/1997 Rodde ............................ 24/541

(Continued)

FOREIGN PATENT DOCUMENTS

DE 100 44 112 C 4/2001
DE 100 44 112 C2 4/2001

(Continued)

OTHER PUBLICATIONS

German Examination Report dated Sep. 7, 2012 for Application No. 10 2008 060 407.0, 5 sheets.

(Continued)

*Primary Examiner* — Jerry Redman
(74) *Attorney, Agent, or Firm* — Christie, Parker & Hale, LLP

(57) ABSTRACT

A window lifter assembly is provided including a flexible pulling means for transmitting a driving force produced by a window lifter drive to a window pane to be adjusted, having a carrier, which is to be coupled to flexible pulling means and to which the window pane is to be fixed so that the window pane is connected to the flexible pulling means via the carrier. Additionally, the window lifter assembly includes guiding means being spaced from the carrier for guiding the window pane along an adjustment path defined by the guiding means. The window pane is moved together with the carrier in said adjustment path if a drive force is applied to the window pane without the carrier engaging in a guiding device that extends along the adjustment path in addition to the connection of the carrier to the flexible pulling means.

23 Claims, 23 Drawing Sheets

(56) References Cited

U.S. PATENT DOCUMENTS

| | | | | | |
|---|---|---|---|---|---|
| 5,778,599 | A * | 7/1998 | Saito | ............................... | 49/375 |
| 5,907,927 | A * | 6/1999 | Lieb et al. | ....................... | 49/375 |
| 5,992,099 | A * | 11/1999 | Thomas | .......................... | 49/375 |
| 6,460,296 | B1 | 10/2002 | Arquevaux | | |
| 6,557,302 | B1 * | 5/2003 | Kaps | ............................... | 49/375 |
| 8,146,293 | B2 * | 4/2012 | Brownlie et al. | ............... | 49/375 |
| 8,240,086 | B2 * | 8/2012 | Mangold et al. | ................ | 49/375 |
| 2004/0154227 | A1 | 8/2004 | Yoshimura | | |
| 2005/0072051 | A1 * | 4/2005 | Pound et al. | .................... | 49/375 |
| 2006/0130407 | A1 * | 6/2006 | Castellon | ........................ | 49/375 |
| 2008/0289256 | A1 | 11/2008 | Mangold et al. | | |
| 2009/0000202 | A1 | 1/2009 | Eskhardt et al. | | |
| 2009/0307977 | A1 | 12/2009 | Mangold et al. | | |
| 2010/0088964 | A1 * | 4/2010 | Costigan et al. | ................ | 49/372 |

FOREIGN PATENT DOCUMENTS

| | | | |
|---|---|---|---|
| DE | 42 43 952 | C5 | 9/2002 |
| DE | 101 47 452 | A1 | 4/2003 |
| DE | 10 2004 017 645 | A1 | 11/2005 |
| DE | 10 2004 043 000 | A1 | 3/2006 |
| DE | 10 2005 061 009 | B1 | 8/2007 |
| DE | 10 2005 061 009 | B3 | 8/2007 |
| DE | 10 2006 030 238 | A1 | 1/2008 |
| DE | 10 2006 060 097 | A1 | 6/2008 |
| DE | 20 2007 014 817 | U1 | 3/2009 |
| DE | 20 2007 018 213 | U1 | 6/2009 |
| EP | 1 966 459 | B1 | 9/2008 |
| FR | 2 781 006 | | 1/2000 |
| FR | 2 830 894 | | 4/2003 |
| JP | 2007-278061 | | 10/2007 |
| WO | WO 2007/071629 | A1 | 6/2007 |
| WO | WO 2008/000569 | A1 | 1/2008 |
| WO | WO 2008/015026 | A1 | 2/2008 |

OTHER PUBLICATIONS

German Search Report for Application No. 10 2008 064 566.4, dated Feb. 11, 2009, 4 sheets.

English translation of Internationl Preliminary Report on Patentability for Application No. PCT/EP2009/065840, dated Jun. 7, 2011, 8 sheets.

English translation of counterpart German Office Action dated Jul. 3, 2012 for Application No. DE 20 2007 018 213 U1, 2 sheets.

International Search Report, dated Mar. 22, 2010, corresponding to PCT/EP2009/065840, 7 pages.

Office action in parallel Korean Application No. 10-2011-7011805, dated Apr. 15, 2013 (5 sheets), and English translation (5 sheets).

English translation of Japanese Office action for Application No. 2011-537970, dated Jul. 2, 2013, 2 pages.

* cited by examiner

FIG 5C
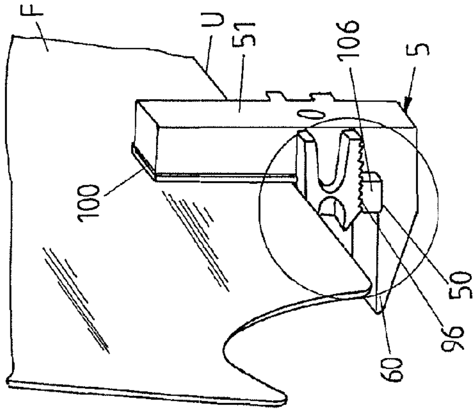
FIG 5B
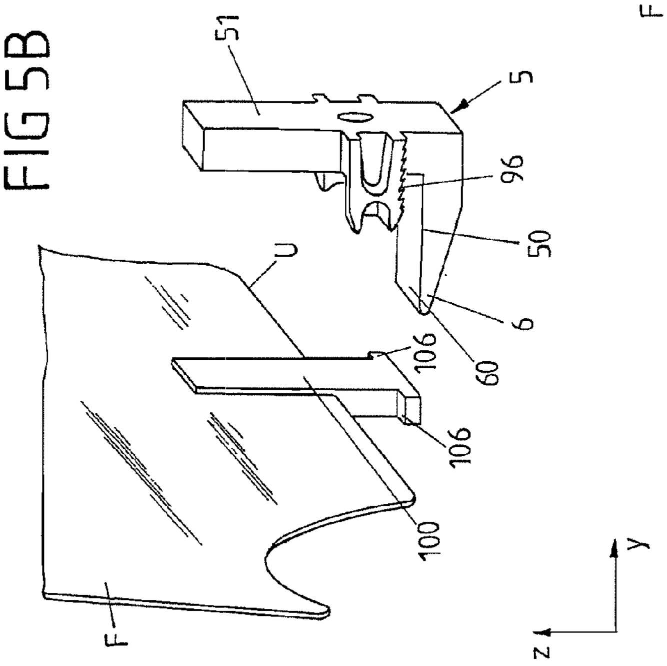
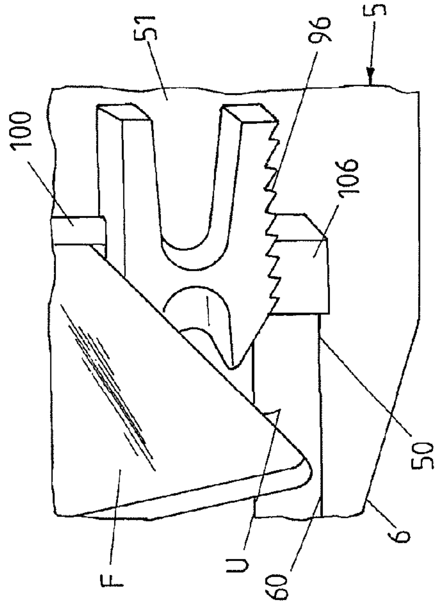
FIG 5D

WINDOW LIFTER ASSEMBLY

CROSS-REFERENCE TO A RELATED APPLICATION

This application is a National Phase Patent Application of International Patent Application No. PCT/EP2009/065840, filed on Nov. 25, 2009, which claims priority of German Patent Application Number 10 2008 060 407.0, filed on Dec. 01, 2008.

BACKGROUND

The invention relates to a window lifter assembly for a motor vehicle and a method for its assembly.

Such a window lifter assembly comprises a flexible pulling means for transferring a drive torque produced by a window lifter drive to a window pane of a motor vehicle to be adjusted as well at least one carrier, which is on one hand tied to the flexible pulling means and to which on the other hand the window pane is to be fixed so that the window pane is connected via the carrier to the flexible pulling means.

Such window lifters are designated as cable or pulling means window lifter. Hereby a section of the flexible pulling means designated as adjustment section is guided, for instance by using deflectors, along the adjustment direction of the window pane to be adjusted and moves while operating the window lifter drive along its extension direction. Thereby, the carrier tied to the flexible pulling means, more exact to its adjustment section, is taken along so that said carrier also moves along the adjustment direction. If the window pane to be adjusted is now fixed to said carrier as intended, then said window pane is being adjusted together with the carrier along its adjustment direction, namely for instance—depending on the drive direction—raised or lowered in order to close or release a window opening of a motor vehicle.

At present, guiding means being different from the carrier and being spaced apart from the carrier contact free are provided at the window lifter assembly in order to guide the window pane along a (regularly curved) adjustment path defined by said guiding means, wherein the window pane is moved together with the carrier on said adjustment path, when a driving force is transferred to the window pane via the flexible pulling means and the carrier.

Said guiding means can be in particular one or multiple lateral frame parts, into which the window pane to be adjusted engages with a lateral edge, respectively. Other modifications of the guiding means are also possible; thereby it is of importance that the guiding means differ from the carrier via which the window pane is in connection to the flexible pulling means of the window lifter assembly, and the carrier does not engage with said guiding means, namely is being spaced apart from said guiding means contact free. This means that the adjustment path along which the window pane moves during an adjustment movement is imposed to the window pane directly by the guiding means being different from the at least one carrier and being spaced apart contact free from said carrier, and namely at present without that the carrier would engage additionally to its connection to the flexible pulling means in a guiding direction continuing along the adjustment path, which would impose a movement along the adjustment path to the carrier.

Such window lifter are called “trackless window lifter”—in contrast to window lifters with track bound carriers, in which a guiding track is arranged to the respective carrier of the window lifter, wherein the carrier is guided along the adjustment path provided for the window pane by means of said guiding track. In case of window lifters with track guided carriers, the carrier imposes a movement along the adjustment path determined by the course of the guiding track upon the corresponding window pane fixed to said carrier. The window pane is hereby guided with its lateral edges such that said window pane can follow the adjustment path determined by he guiding track and by the carrier guided by said guiding track.

In contrast, the at least one carrier of the (trackless) window lifter assembly is at present freely guided, that means no guiding device (for instance in form of a guiding track) is assigned to said carrier, into which the carrier would engage and wherein said guiding device could impose a movement along the adjustment path upon the carrier. Accordingly, at present an adjustment movement along the adjustment path is directly imposed upon the carrier—when operating the window lifter—directly by the window pane itself, when said window pane—triggered by a drive torque of a corresponding window lifter transmitted by the flexible pulling means and the carrier—is moved along the corresponding guiding means in adjustment direction, compare for instance DE 10 2004 043 000 A1, in which different window lifter concepts are illustrated and explained.

In case of a window lifter with trackless (free) guided carrier, the assembly (installation) of carrier and window pane with the goal of fixing the window pane to the carrier and hereby to connect it to the flexible pulling means of the window lifter is regularly hindered. The assembly occurs usually in the way that the window pane guided by the corresponding guided means, as for instance lateral guiding channels at the window frame, is moved (lowered) along its adjustment path and is thereby engaged to the corresponding carrier.

In contrast to this, a track guided carrier can be positioned in a simple manner at a defined location of the adjustment path (that means in the adjustment track) of the window pane so that the window pane engages compulsory with the carrier at a determined time point via its lower edge when lowering along the adjustment path and can then be fixed via suitable fixing means to said carrier. In order to fix the carrier—being already connected to the flexible pulling means of the window lifter—at a specific location of the corresponding guiding track and therefore of the adjustment path of the window pane for instance a self-locking modification of the window lifter drive can thereby be used.

In case of a trackless guided carrier such a simple positioning in the adjustment path/adjustment track of the window pane is not possible since the adjustment section of the flexible pulling means carrying the carrier extends regularly straight forward before tying the carrier to the corresponding window pane and therefore does not continue along the usually curved adjustment path of the window pane. This means that the window pane would bypass the carrier during lowering along its curved adjustment path with the goal to engage the window pane for assembly purposes with the carrier.

SUMMARY

The problem of the present invention is to provide a window lifter assembly of the previously mentioned kind with a trackless guided carrier, which allows for assembly of the window pane to at least one corresponding carrier by simple means.

According to an exemplary embodiment of the invention, the window lifter assembly comprises a holder, which lays outside of the adjustment path of the window pane and wherein the carrier (preferably already tied to the flexible pulling means or more exactly its adjustment section) can be arranged at said holder for assembling the window lifter assembly so that the carrier can be supported by the holder along at least one spatial direction in order to position the carrier for engagement with the window pane for assembly purposes in a defined manner, wherein the carrier comprises furthermore an extension, which projects into the adjustment path of the window pane, if the carrier is arranged at the holder, in particular if that carrier is supported by the latter one along at least one spatial direction.

The extension allows for the carrier to capture a window pane to be lowered along its adjustment path for assembly purposes and therefore bypassing the carrier being arranged outside of the adjustment path and therefore to provide a first engagement between carrier and window pane.

The extension of the carrier is thereby characterized in that said extension is able to capture the window pane (in particular the lower edge of the window pane) in a position designated as assembly position, wherein the carrier and the window pane comprise in said position—along a direction crosswise to the adjustment path of the window pane—another relative position towards each other as in the functional position, in which the window pane can be fixed to the carrier. In other words, the extension projects—in respect to the arrangement of the carrier at the corresponding holder—if looked at along a direction crosswise to the adjustment path of the window pane so far from the carrier that said carrier is able to capture the window pane to be lowered along the adjustment path in assembly position, wherein the carrier is spaced apart substantially from the functional position crosswise to the adjustment path of the window pane, in which said position said carrier is to be fixed to the window pane as intended.

After capturing the window pane by means of the extension being spaced apart from the carrier, the carrier is transferred (for instance displaced) from the assembly position into the functional position being different from the assembly position, in which the carrier is to be fixed to the window pane is intended.

The holder, in which the carrier can be arranged for assembly purposes outside of the adjustment path of the window pane, is thereby to be understood as to be at least one stop, by which the carrier can be supported in order to obtain a defined position, and also the, when the window pane engages with the carrier as intended during lowering. Thereby, an additional retaining effect occurs by the flexible pulling means to which the carrier is already been tied to at the time of assembling. Such a stop can be provided at a supporting part of a motor vehicle, as for instance a door wall or a module carrier to which the window lifter assembly is mounted to.

The holder is provided stationary at the window lifter assembly so that said holder is not moved together with the carrier, in particular neither along the adjustment path of the window pane nor lateral to this in direction towards the window pane to be adjusted.

The adjustment path along which the window pane—and together with said window pane also the carrier—can be moved by flexible pulling means, continues between a first and a second end, regularly an upper and a lower end, wherein the carrier at hand can be arranged by means of the holder at a location, which—if looked at along at the connecting line between the first and the second end of the adjustment path—is between these two ends and is spaced apart from said two ends along the connecting line. The solution according to the invention allows it therefore to arrange the carrier for assembly at any location of the adjustment path, thereby however crosswise to the adjustment path being spaced apart from said path, since said carrier can capture by means of its extension the window pane being lowered during assembly. Therefore, the position, at which the carrier is located, when said carrier is arranged at the corresponding holder for assembly purposes, can be located approximately also in a central area of the connecting line between the two ends of the adjustment path, for instance spaced apart by least about 20% of the length of each distance from each of the two ends.

As already explained the carrier can be fixed according to the invention to the window pane in the functional position, which differs from the assembly position of the carrier in respect to the window pane, in which the carrier captures the window pane, when said window pane is moved along the adjustment path for assembly purposes, while the carrier is arranged at the corresponding holder. Thereby, the assembly position and the functional position of the carrier in respect to the window pane are spaced apart from each other crosswise to the adjustment path.

In order to be able to transfer the carrier after capturing the window pane from its assembly position to its functional position, in which the window pane and carrier are fixed to each other, the carrier comprises a transition region at its extension, along which the window pane and the carrier are movable relatively to each other.

According to an exemplary embodiment of the invention, the transition region extends essentially crosswise to the adjustment path of the window pane.

According to another exemplary embodiment of the invention, said transition region is tilted in an acute angel of substantially less than 90° towards the adjustment path. Hereby a movement of the window pane along the adjustment path can be realised by the transition region in a relative movement of the carrier in respect of the window pane with a component crosswise to said adjustment path in order to transfer the carrier from its assembly position into its functional position in respect to the window pane.

If the extension extending tilted to the adjustment path is foldable connected to a base body of the carrier, the extension can be folded by the effect of the window pane sliding along the extension towards a window pane, in particular such that the window pane is housed in the functional position of the carrier between said extension and a further arm of the carrier.

A trigger element can be arranged for this at the extension of the carrier, via which the extension is in contact to a further component of the carrier and which is being struck by the window pane, if said window pane moves along the transition region of the extension whereby a pivoting movement of the extension is being triggered.

The triggering element can be for instance a longitudinal flexible element, like in form of a rope, or can be an elastic or plastic deformable longitudinal element or can be a longitudinal element provided with a hinge.

The extension provided at the carrier is thereby in particular arranged such that the window pane engages in the area of its lower edge with the extension of the carrier, when said window pane is moved (lowered) for assembly purposes. Thereby, the window pane does not has to engage directly with the carrier, but it can be furthermore also provided that to the window pane, in particular to its lower edge, an adapter is fixated, via which the window pane engages with the carrier and via which said window pane is optionally to be fixed also in the functional position to the carrier.

When transferring the window pane from its assembly position into its functional position along the transition region of the extension, the window pane does not have to be necessarily in contact to the transition region, also not via the adapter; moreover it can be also provided that the window pane during the transfer from the assembly position into the functional position along the transition region is spaced apart from said transition region, for instance, if the window pane is in contact during said movement to a trigger element designated to the carrier.

In the functional position of the carrier in respect to the window pane, a fixation of these two components to each other occurs via a suitable fixing or connecting means, for instance in form of a bolted or rivet connection, in form of a snap-in connection, a clamp connection or such.

BRIEF DESCRIPTION OF THE DRAWINGS

Further details and advantages of the invention are becoming clear by the following description of examples by means of the figures.

FIGS. 4G-4I show further modifications of the arrangement of FIG. 3A.

FIGS. 5A-5D show a method of assembling a carrier to the corresponding window pane in schematic form wherein a further embodiment in respect to the fixing means for fixation of the carrier to the window pane is taken as a basis.

DETAILED DESCRIPTION

Figure 1A:
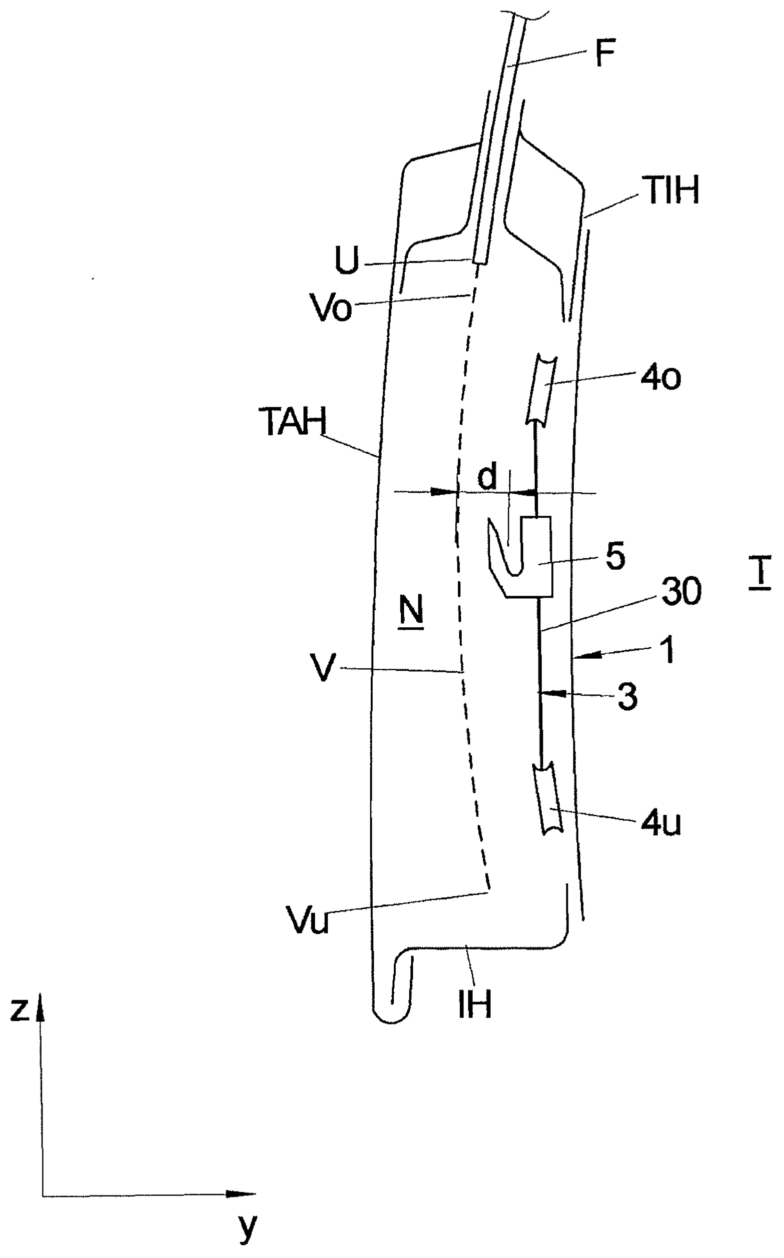
FIG. 1A shows a schematic sectional view of a motor vehicle door with a window lifter with trackless guided carrier for fixing the carrier to the window pane to be adjusted.

FIG. 1A shows a schematic view of the motor vehicle door with a door outer skin TAH and a door inner skin TIH, which define between them a wet area in form of a door casing. The so-called drying area T of the motor vehicle door is located on the side of the door inner skin TIH opposing the door outer skin TAH and therefore facing the vehicle interior.

The door inner skin TIH comprises an extensive section which is covered by means of a door module carrier 1 (moisture proofed). Different functional components of a motor vehicle door as for instance a door lock, a loud speaker and/or a window lifter assembly can be pre-assembled to such a door module carrier before the door module carrier is inserted together with the components pre-assembled thereto into a motor vehicle door such that said door module carrier covers the corresponding recess in the door inner skin.

The following modification of a window lifter group to be explained by means of different embodiments is however regardless of whether this is pre-assembled to the door module carrier already before the installation into the motor vehicle door or if the window lifter assembly is being integrated directly in a door inner skin or door inner wall as part of a motor vehicle door. In the following, the carrier of the window lifter assembly is therefore designated as aggregate carrier, wherein this definition shall comprises door module carriers, which are assembled together with the functional components pre-assembled thereto into a motor vehicle door as well as a door inner skin or door inner wall, which is being equipped as part of a motor vehicle door individually with assigned functional components as for instance a window lifter assembly.

At present only a window lifter assembly is illustrated as part of the functional components to be assembled to the aggregate carrier 1, here in form of a door module carrier, namely with a flexible pulling means 3, which is—in known manner by means of two deflectors 4*o*, 4*u* (for instance in forms of deflection rollers) being spaced apart from each other along the vertical vehicle axis z—guided such that an adjustment section 30 of the flexible pulling means 3 extends essentially along said vertical vehicle axis z, which forms at the same time also the main adjustment direction of the window pane F of the motor vehicle door to be adjusted by means of the window lifter assembly.

A carrier 5 is tied to the flexible pulling means 3, for instance in form of a rope, or more exact to its adjustment section 30, wherein the window pane F to be adjusted is to be fixed to said carrier.

When operating the window lifter, that means if the flexible pulling means is moved by a corresponding window lifter drive, the flexible pulling means moves along its extension direction such that in particular the adjustment section 30 of the flexible pulling means 3 is moved along the adjustment direction (vertical vehicle axis z) of the window pane 3 to be adjusted. Hereby the carrier 5 tied to the flexible pulling means 3 is picked up and therefore—depending on the driving direction of the window lifter drive—is moved along the adjustment direction z up or down.

If the window pane F to be adjusted is fixed to the carrier 5 then said window pane is picked up during a movement of the adjustment section 30 of the flexible pulling means 3 along the adjustment direction z via the carrier 5 so that the window pane F—depending on driving direction of the adjustment drive—is raised for closing a corresponding window opening or is lowered for releasing the window opening.

Thereby the window pane is not being regularly moved straight forward along the vertical vehicle axis z as main adjustment direction, but rather along an adjustment path V deviating here from and continuing frequently curved, wherein said adjustment path extends between an upper adjustment position Vo and a lower adjustment position Vu. The upper and lower adjustment position Vo, Vu of the window pane F are thereby—in each case in respect to the lower edge U of the window pane F—spaced apart from each other along the vertical vehicle axis z, that means the main adjustment direction of the window pane F to be adjusted; however, the adjustment path V along which the window pane F to be adjusted is being actually moved during an adjustment movement (raising or lowering) does not correspond to the shortest connecting line between said two adjustment positions Vo, Vu. In fact, the actual adjustment path V is regularly curved for adaption to the design of a lateral vehicle body or a lateral vehicle door at which the window pane F to be adjusted is arranged.

In case of conventional window lifters with track guided carrier, a movement along a curved guiding path is imposed to the window pane to be adjusted usually such that the carrier of the window lifter (form-locking and thereby at the same time longitudinally disclosable) engages with an assigned guiding track, which guides the carrier and therefore also the window pane fixed to the carrier along a pre-defined (curved) adjustment path. The guiding track continues for this along an accordingly curved guiding path.

In contrast the present window lifter is a so-called trackless window lifter, wherein no guiding device is assigned to the carrier 5 by means of which a movement along a defined an adjustment path would be imposed upon the carrier 5. In fact, the carrier is guided by means of the flexible pulling means 3 or its adjustment section 30 between the two deflector elements 4*o*, 4*u* of the window lifter assembly 2. That means that if the carrier 5 is not yet being tied to the assigned window pane F as shown in FIG. 1A, then the carrier would move during operation the assigned window lifter drive straight forward between the two deflecting elements 4*o*, 4*u*.

If the trackless guided carrier 5 is in contrast connected to the assigned window pane F, then an adjustment movement along a pre-determined adjustment path V is imposed upon the carrier 5, when said carrier during operation of an assigned window lifter drive is moved along the main adjustment direction of the window pane F to be adjusted, by the window pane F, wherein said adjustment path is defined by the lateral guiding means assigned to the window pane F.

In case of the lateral guiding means of the window pane F, for instance the frame parts of a window frame can be used, in which the window pane F is guided with its lateral pane edges. The frame parts can comprise for this guiding channels, into which the window pane engages with a lateral window edge, respectively. In case of so-called frameless doors of convertible vehicles, such frame parts can continue below the door trim in door casing (wet room N).

In case of such a window lifter with trackless guided carrier, the assembly of window pane F and carrier 5 with the goal to fix these two components F and carrier 5 with each other, can be hindered, if the window pane F is lowered for this in the usual manner along its adjustment path V. This is because the carrier 5 being guided freely between the two deflecting element 4*o*, 4*u* before the connection to the window pane F is in this case spaced apart from the adjustment path crosswise to the adjustment path V, compare the distance d in FIG. 1A. This means that the window pane F would bypass during lowering the carrier 5 arranged between the two deflecting elements 4*o*, 4*u* as recognizable in FIG. 1A, whereby the dotted illustrated adjustment path V of the window pane F is spaced apart from the carrier 5 by a distance d crosswise to the adjustment path V.

This is in particular valid, if the carrier 5—looked at along the vertical vehicle axis z—is arranged not directly in the area of the lower deflector element 4*u* and therefore to the lower adjustment position Vu, but rather as illustrated in FIG. 1A in a central area of the adjustment path between the upper and lower deflector element 4*o*, 4*u* or upper and lower adjustment position Vo, Vu of the window pane F. This is because in this central area of the adjustment path the (horizontal) distance between the adjustment path V and the carrier 5 guided freely between the two deflector elements 4*o*, 4*u* is usually in particular large.

Figure 1B:
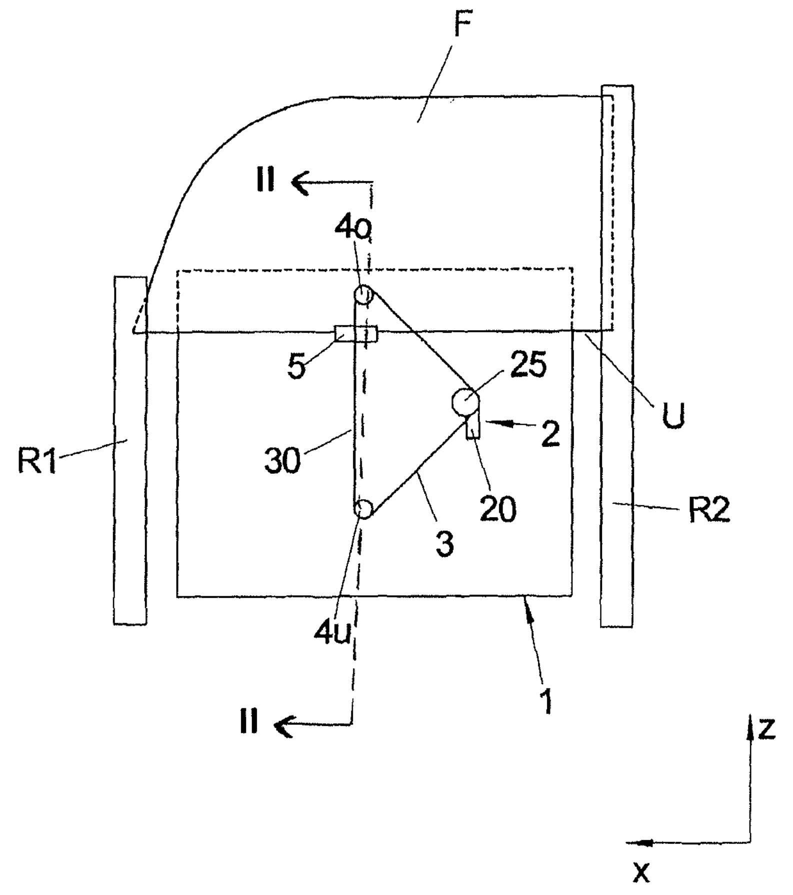
FIG. 1B shows a schematic top view of a window lifter of the kind shown in FIG. 1A after fixing the carrier to the window pane.

FIG. 1B shows the window lifter assembly of FIG. 1A in a schematic top view, however, after the connection of the window pane F to be adjusted to the assigned carrier 5 in the area of the window lower edge U.

The window lifter assembly is as already been illustrated in FIG. 1A, arranged on an aggregate carrier 1, here in form of a module carrier, and comprises for producing a drive torque a window lifter drive 2 with a drive aggregate 20 for instance in form of drive motor or a crank drive, and a transmission (adjustment transmission 25) being arranged downstream of a drive motor 20 for coupling the flexible pulling means 3 to the drive aggregate 20. The latter can comprise in a known manner for instance a rope drum, which is being embraced by the flexible pulling means 3 so that when operating the window lifter drive 2 the rope drum is rotated and thus the flexible pulling means 3 is moved.

Depending on the drive direction of the drive motor 20 and therefore depending on the rotation direction of the rope drum of the adjustment transmission 25, the flexible pulling means 3 is thereby moved such that the carrier 5 tied to the adjustment section 30 of the flexible pulling means is moved along the main adjustment direction z upwards or downwards and thus the window pane F, fixed to the carrier 5, is being picked up in order to close or release a window opening of a motor vehicle assigned to the window pane F.

The window pane F is thereby guided with its lateral window edges in assigned guiding means, here in form of frame parts R1, R2 of the window frame, which are provided in each case with a guiding channel, into which the window pane F can engage with its respective lateral window edges.

The guiding means R1, R2, for instance in form of frame parts, continue thereby such (curved) that they impose a defined, pre-determined adjustment path V, compare FIG. 1A, upon the window pane F, if the window pane F is moved by means of the carrier 5 along the main adjustment direction z. In other words, the window pane F is not moved along a straight line corresponding to the vertical vehicle axis z, but rather along an (in respect to the straight line curved) adjustment path which is determined by the course, in particular the curve of the lateral guiding means R1, R2.

By means of the FIG. 1A and 1B, a window lifter with trackless carrier is explained in each case by means of the example of a so-called single-stranded window lifter, in which a flexible pulling means comprises only in each case an adjustment section 30 extending along the main adjustment direction z. The previous explanations are however valid in the same manner for multiple-stranded, in particular double-stranded window lifters, in case of which two (or more) adjustment sections 30 of a flexible pulling means 3 extend in each case along the main adjustment direction z of the window pane F to be adjusted. Thereby an upper and lower deflector element as well as a carrier to be tied thereto is arranged to each of the corresponding adjustment sections 30 of the flexible pulling means 3, wherein via said carrier the respective adjustment section 30 of the flexible pulling means 3 is connected to the window pane F to be adjusted.

Figure 2:
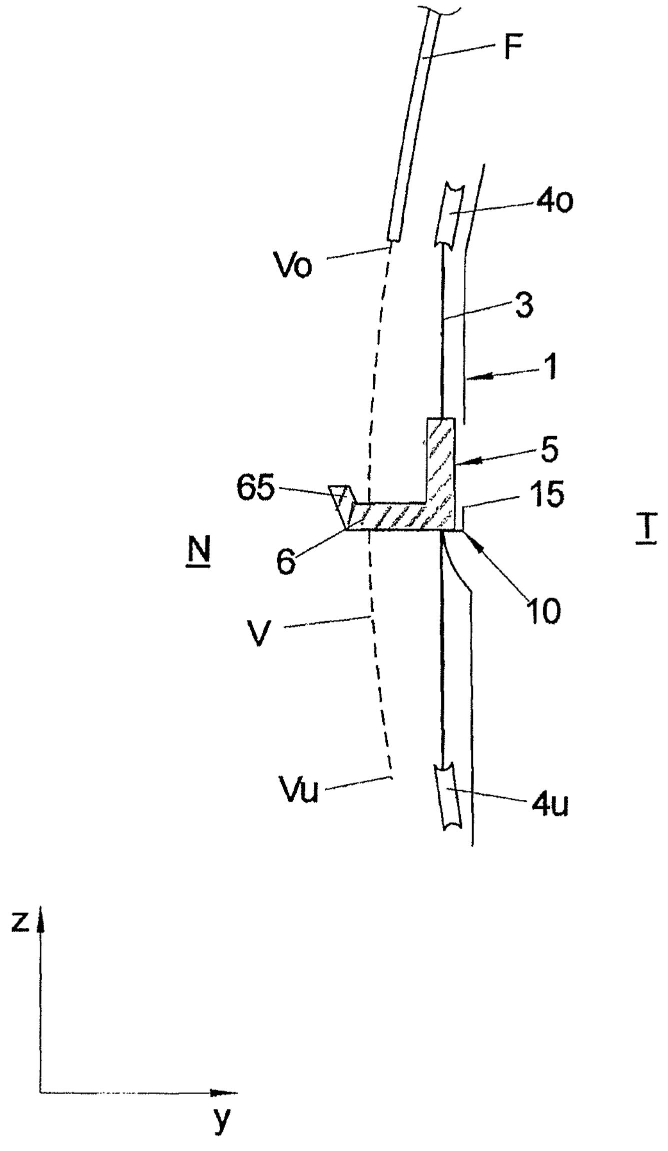
FIG. 2 shows a set up according to FIG. 1A, wherein the carrier comprises an extension in order to capture the corresponding window pane when said window pane is being lowered for assembly purposes along its adjustment path.

In order to allow the window pane F during lowering along its adjustment path V defined by the guiding means shown in the FIG. 1B during assembling that the window pane F (in the area of its lower edge U) can be captured by the assigned carrier 5 and therefore does not bypass said carrier, the carrier 5 comprises according to FIG. 2 an extension 6 (with angled end section 65), which protrudes into the adjustment path V of the window pane F, if the carrier 5 is arranged beside the adjustment path, that means is being spaced apart from the adjustment path crosswise to the adjustment path V (that means along a so-called horizontal vehicle cross axis y).

The carrier 5 is specifically arranged at a holder 10 (provided at the aggregate carrier 1), which houses the carrier 5 such that said carrier can be supported by the holder—along at least one spatial direction—in particular also if the window pane F strikes the extension 6 sticking out from the carrier 5 when lowering along the adjustment path V (with its lower edge U). The holder 10 for the carrier 5 defines therefore at least one stop/supporting section, by which the carrier 5 can be supported such that said carrier is being kept during the lowering of the window pane F for assembly purposes in a defined position and retains this position also if the window pane F (with its lower edge U) strikes the extension 6 of the carrier 5. The position of the carrier 5 is thereby additionally stabilized in that said carrier is already furthermore tied to the flexible pulling means 3 continuing almost tightly between the deflector elements 4*o*, 4*u*.

In the simplest case, the holder can be formed for instance by a surface of the door element, as for instance the aggregate carrier 1 or another component of the considered vehicle door.

The holder 10 and as well as the carrier 5 are at present—if looked at along the vertical vehicle axis z or the main adjustment direction of the window pane F—being substantially spaced apart from both ends Vo, Vu of the adjustment path V (as well as from the two deflector elements 4*o*, 4*u*) and are located in the embodiment approximately in the centre between the two ends Vo, Vu of the adjustment path V or the deflector elements 4*o*, 4*u*.

The extension 6 of the carrier 5 has the function to capture the window pane F when lowering along its adjustment path V, when the carrier 5 is arranged in the assigned holder 10. The extension 6 is thereby formed at the carrier 5 such that the carrier 5—in respect to the window pane F—is in an assembly position when capturing the window pane F, which is—crosswise to the adjustment path V of the window pane F, that means along the horizontal vehicle cross axis y—spaced apart from the functional position, in which the window pane F and the carrier 5 are to be fixed to each other as intended. An assembly opening 15 is provided in the aggregate carrier 1 for the last assembly step according to FIG. 2.

Further details in respect to capturing the window pane in an assembly position of the carrier and in respect to the subsequent transfer of the carrier into a functional position in respect to the window pane, in which the window pane F and the carrier 5 are to be fixed to each other as intended, are explained in the following by means of the detailed illustration of FIG. 3A.

Figure 3A:
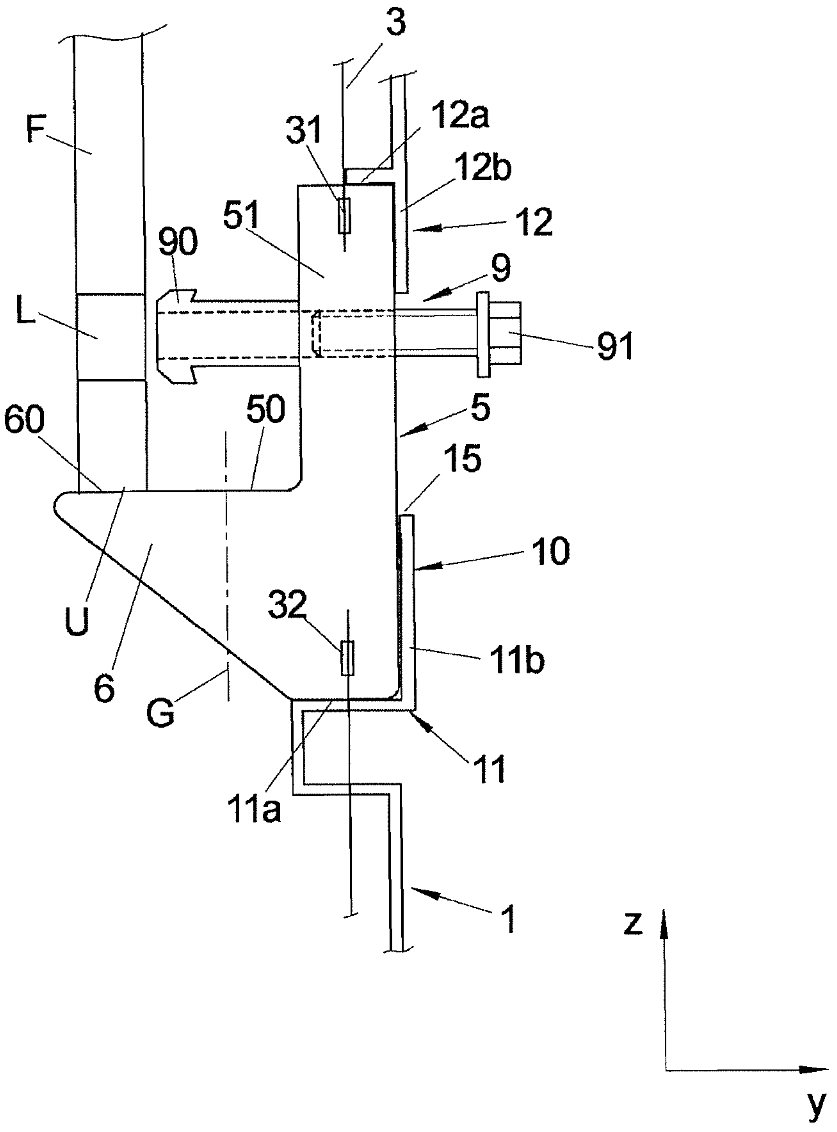
FIG. 3A shows a detail of a set up according to FIG. 2 in respect to a fixation of the carrier to the window pane.

The detailed illustration of FIG. 3A shows thereby not simply an excerpt of FIG. 2 in the area of the carrier 5 arranged at the holder 10, but further details relating to fixing means via which the carrier 5 is to be fixed as intended to the window pane F, in particular in the area of its lower edge U.

According to FIG. 3A, a recess is provided in the aggregate carrier 1 as holder 10 for the carrier 5, wherein said recess forms stops or supporting sections 11*a*, 11*b*, 12*a*, 12*b*, by which the carrier 5 can be supported, when said carrier is arranged at the holder 10. Thereby two stops or supporting sections 11*a*, 11*b* form a first stop group 11 which is arranged below the assembly opening 15 of the aggregate carrier 1 and further stops or supporting sections 12*a*, 12*b* form an upper stop group 12, which is provided above said assembly opening 15.

By means of these stops or supporting sections the carrier 5 is supported at least along the vertical vehicle axis z upwards and downwards as well as additionally along the horizontal vehicle cross axis y in a direction away from the adjustment path V.

In how many directions a carrier 5 is to be supported in an assigned holder 10 by forming corresponding stops 11A, 11B, 12A, 12B, respectively, depends on the requirements in each case. The support should be such that the carrier can be kept on one hand reliable in a defined position at the holder 10, while the window pane F is lowered for assembly purposes along the adjustment path in direction to the holder, compare FIG. 2, and that via the stops or supporting sections the forces can be absorbed, which occur, when the window pane F engages during lowering finally with the extension 6 projecting from the carrier 5 for this purpose. Thereby, also the flexible pulling means 3 contributes to which the carrier 5, for instance via so-called cable-end-bottom 31, 32, and assigned end bottom chambers at the carrier is tied itself. Finally, also an assembly tool can be further more used in order to stabilize the carrier 5 in a defined position at the holder 10.

In order to position the carrier 5 in a defined position at the holder 10 and to absorb the forces being effective, when the window pane F strikes the extension 6, a support of the carrier 5 for instance along the vertical vehicle axis z downwards in FIG. 3A guaranteed by the lower stop 11A of the holder 10, is appropriate, however not compulsory as described further below.

The extension 6 projects from the carrier 5 such that the window pane F during lowering along its adjustment path, as illustrated in FIG. 2, strikes (with its lower edge U) said extension 6, when said window pane reaches the vertical position of the carrier 5 (along the vertical vehicle axis z). The carrier 5 is then in respect to the window pane F in a assembly position, in which the carrier 5 has crosswise to the adjustment path V (along the horizontal vehicle cross axis y) such a distance from the window pane F, that a fixation of the carrier 5 to the window pane F as intended is not yet possible.

For this the carrier has to be brought along the said direction crosswise to the adjustment path V (that means along the horizontal vehicle cross axis y) closer to the window pane F or to the pane surface facing the carrier 5 until the carrier has reached its functional position in respect to the window pane F. Hereby, the flexibility of the not yet completely tightened pulling means 3 is used, which allows a certain movement of the carrier 5 in direction to the window pane F. The power impact onto the carrier 5 required for this purpose can thereby occur through the assembly opening 15 of the aggregate carrier 1 provided for this purpose.

The assembly position of the carrier in respect to the window pane F is thereby the position, which the carrier 5 in respect to the window pane F occupies, when the window pane engages with the extension 6 of the carrier 5 while said window pane is moved for assembly purposes along its adjustment path V and the carrier 5 is arranged at the holder provided for this purpose.

The functional position of the carrier 5 in respect to the window pane F is in contrast defined as the position in which the carrier 5 is fixed to the window pane F as intended.

The fixing means 9 of the embodiment of FIG. 3 in form of an expanding element 90 (expansion plug) assigned to the holder and an assigned insert element 91 (bolt or screw) wherein the extending element 90 can be expanded by inserting said insert element, serve the latter purpose. A window hole L is assigned to said fixing means 9 on the side of the window pane F, wherein the expanding element 90 engages with said window hole, if the carrier is located in a assembly position in respect to the window pane as intended. For this purpose the carrier, as already explained, by using the flexibility of the pulling means 3 is to be brought closer to the window pane F (which is guided in the embodiment by means of assigned guiding means R1, R2, compare FIG. 1F along a defined an adjustment path).

After reaching the functional position, not illustrated in FIG. 3A, the carrier 5 is then located together with the window pane F in the adjustment path V. The window pane F lies then with its lower edge U opposite to the bottom area 50 of the carrier 5 originally not being in the adjustment path V of the window pane F.

When transferring the carrier 5 from its assembly position, shown in FIG. 3A, into its functional position in respect to the window pane F, in which said carrier is to be fixed to the window pane F as intended, the window pane F (with its lower edge) can be moved along a transition region provided at the extension 6 of the carrier 5.

When reaching the functional position of the carrier, the window pane F rests with its surface facing the carrier 5 against an arm 51 of the carrier 5 provided for this purpose and is supported with its lower edge (directly or indirectly via an adapter as subsequently will be explained) by the bottom area 50 of the carrier 5, which is adjacent—if looked at crosswise to the adjustment path V and parallel to the horizontal vehicle cross axis y—to the extension 6 or the transition region 60. This bottom area 50 of the carrier 5 assigned to the pane lower edge U and being opposite in the window pane is not yet located in the adjustment track of the window pane F to be lowered along its adjustment path V, compare FIG. 2, as long as the carrier 5 is still arranged at the holder 10, and is being spaced apart from said holder (along the horizontal vehicle cross axis).

Therefore, the window pane F is captured while moving along the adjustment path V for the purpose of assembling at first by an extension 6 of the carrier 5, which forms during said movement of the window pane for assembly purposes a stop for the lower edge U of the window pane and an adapter provided there, wherein said extension is however not any longer opposite to the window lower edge U after transferring the carrier 5 in its functional position. The window lower edge U is then opposite to the bottom area 50 of the carrier 5 being adjacent to the extension 6. The boundary between extension 6 and actual carrier 5, in particular its bottom area 50 is indicated in FIG. 3A schematically with the dotted-pointed border line G.

Furthermore, it is indicated in FIG. 3A in pointed lines that the bottom area 50 of the carrier 5 can be amended optionally by a recess with a damping element arranged therein for damping purposes.

In FIGS. 3B to 3E four different modifications of the arrangement of FIG. 3A are illustrated, namely in respect to the fixing means via which the carrier can be fixed in its respective functional position to the assigned window pane F. The FIGS. 3B to 3E show thereby, as well as FIG. 3A, carrier 5 and window pane F in the assembly position of the carrier 5, respectively, in which said carrier captures the window pane F when lowering along its adjustment path V, compare FIG. 2. For a detailed illustration of the functional position of the carrier as well as the transition between assembly and functional position, it is being pointed to FIGS. 5A to 5D, explained further below.

Figure 3B:
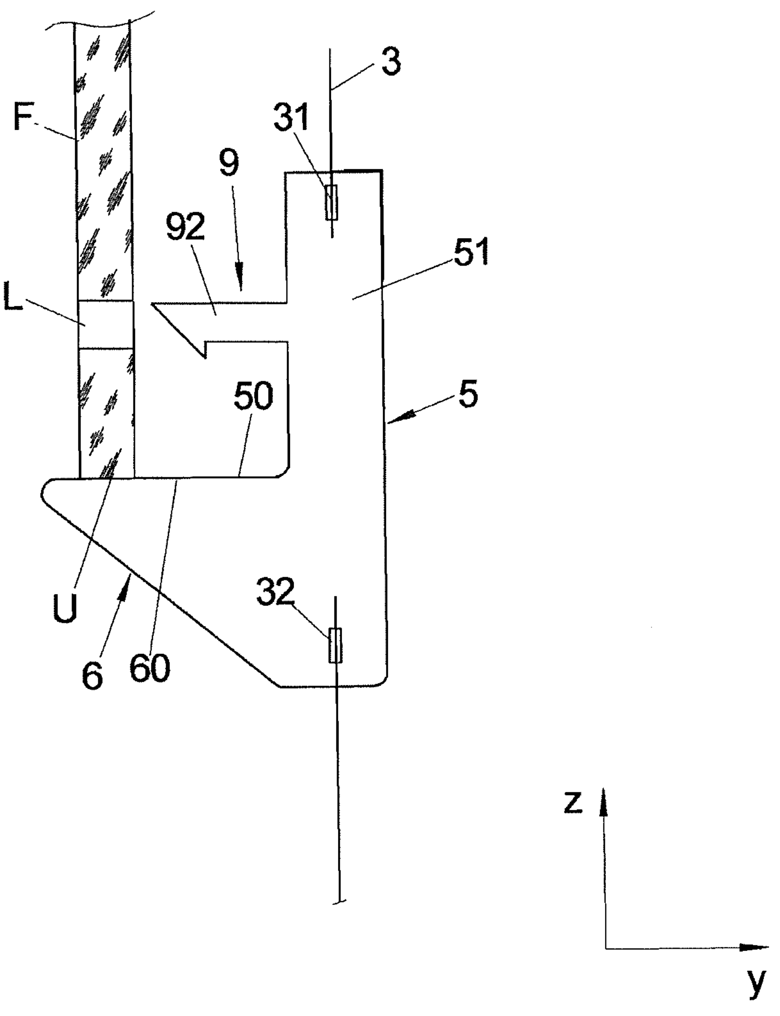
FIGS. 3B-3E show four modifications of the arrangement of FIG. 3A in respect to a fixation of the carrier to the window pane.

According to FIG. 3B, a fixing element 9 in form of a snap element 92 sticking out from the carrier 5, more concrete in form of a fixing hook, is provided at the carrier 5, wherein said snap element can engage with an assigned window hole L of the window pane F, if the carrier 5 is arranged as intended in its functional position in respect to the window pane F, in which the window rests against the lateral arm 51 of the carrier 5, from which the fixing element 9 sticks out.

Figure 3C:
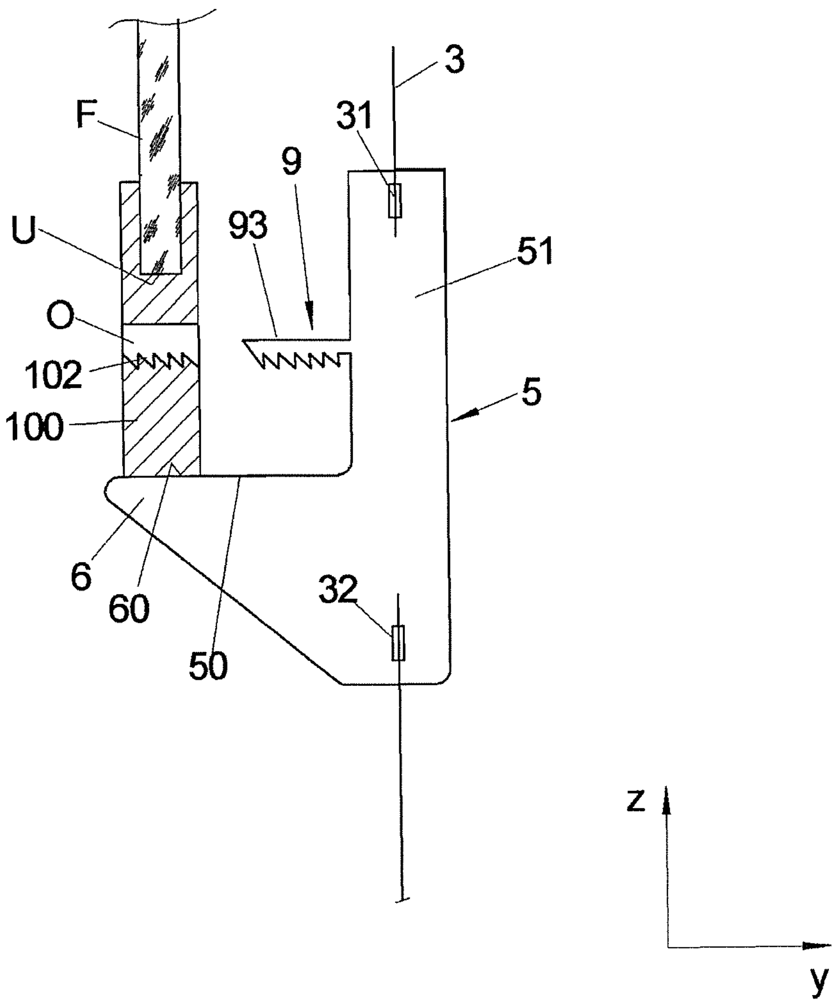
Figure 3D:
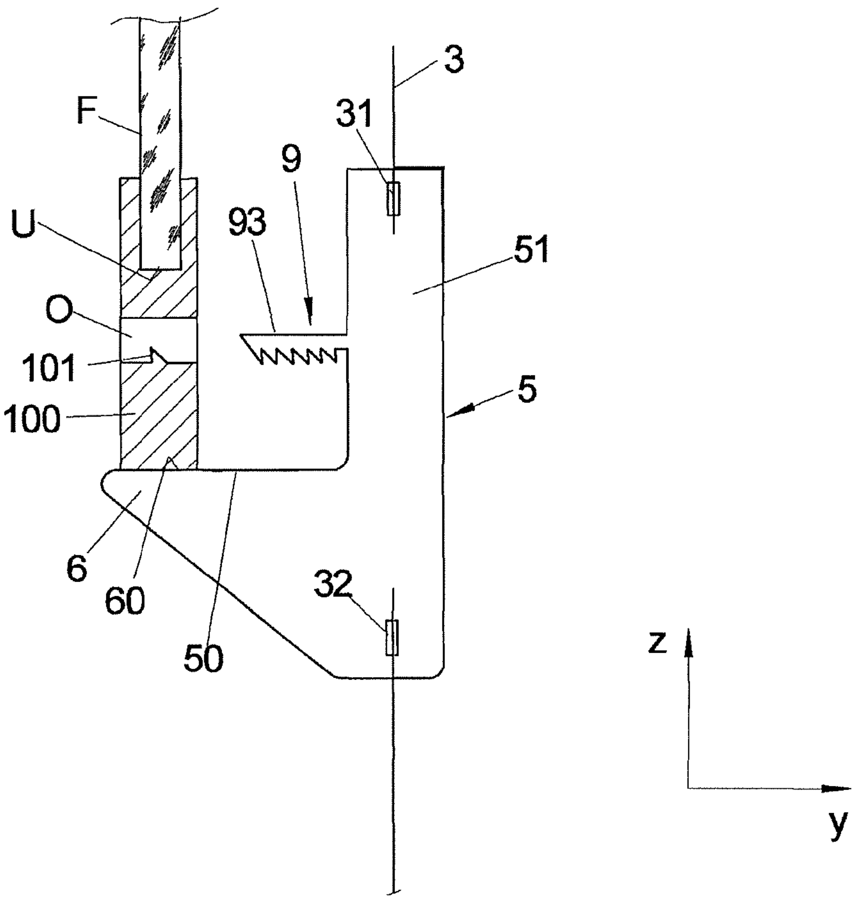

According to the embodiment of the FIGS. 3C and 3D, the fixing element 9 is in each case formed as a snap element 93 in form of a toothing element, to which an opening 0 provided with an opposite toothing 102 or with a single tooth 101 of an adapter 100 fixated in the region of the lower edge U of the window pane F is assigned. The fixing element 9 on the side of carrier does not interact here directly in each case with the window pane F itself, but rather with an additional element in form of an adapter 100, which is fixated via suitable connecting means, for instance adhesive, in the region of the lower edge U of the window pane F.

In this case, when moving (lowering) the window pane F along its adjustment path V for the purpose of assembly, the window pane F itself is not directly captured by the extension 6 of the carrier 5, but rather its adapter 100. Thereafter, a cross movement of the carrier 5 in respect to the window pane F occurs during the assembly crosswise to the adjustment path V (along the horizontal vehicle cross axis y), during which the window pane slides in the area of its window lower edge U over the adapter 100 along the sliding area 60 of the extension 6, until the carrier 5—via its fixing element 9 in form of a snap element 93 and the assigned snap opening O of the adapter 100—is fixed to the window pane F, and the window pane F rests against a lateral arm 51 of the carrier 5 via its adapter 100.

Figure 3E:
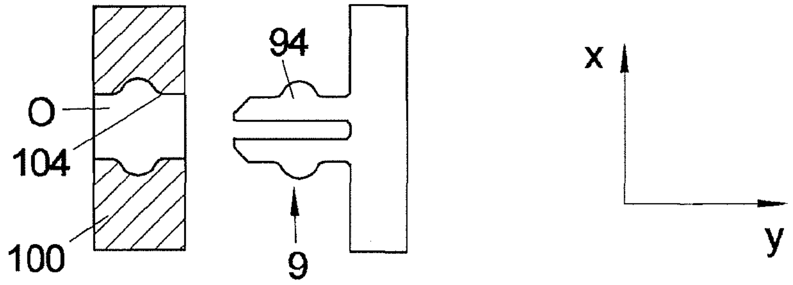

In case of the embodiment of FIG. 3E a fixing element 9 on the carrier side is formed as an elastic clipping element 94, which can be snapped into an assigned snap opening O of the adapter 100.

FIG. 4A to 4I show further modifications of the arrangement of FIG. 3A, which are explained in the following in detail.

Figure 4A:
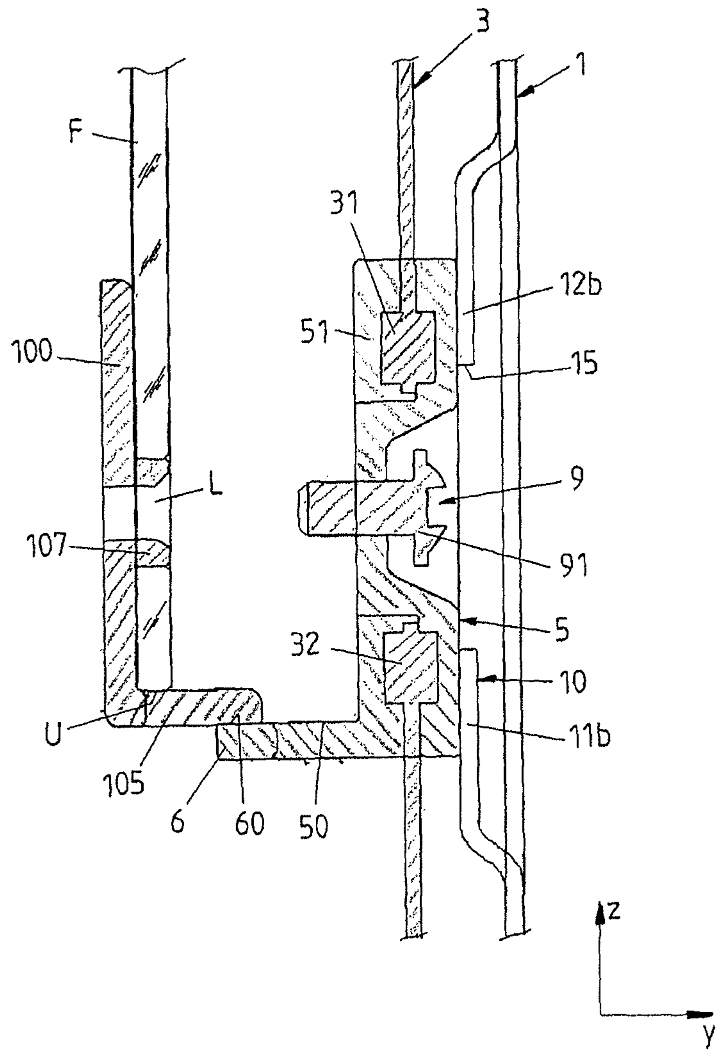
FIGS. 4A-4F show a further modification of the arrangement of FIG. 3A in different illustrations.
Figure 4C:
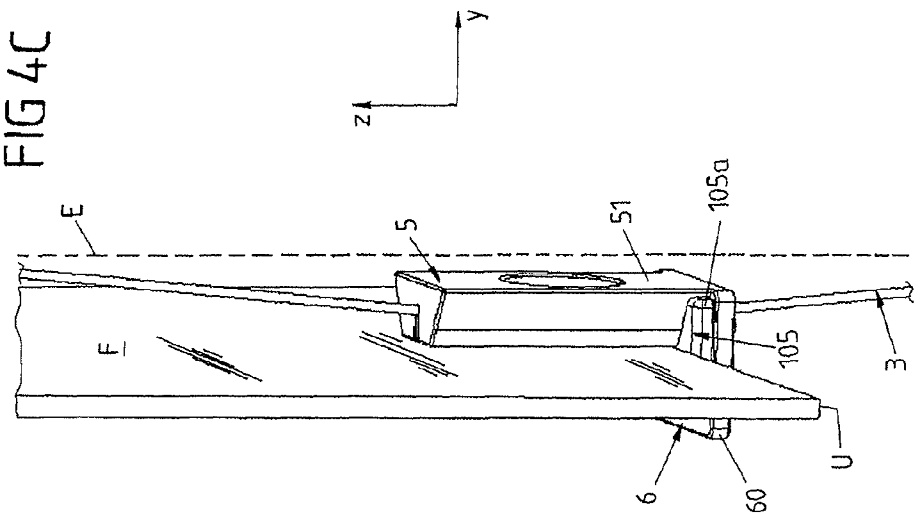
Figure 4B:
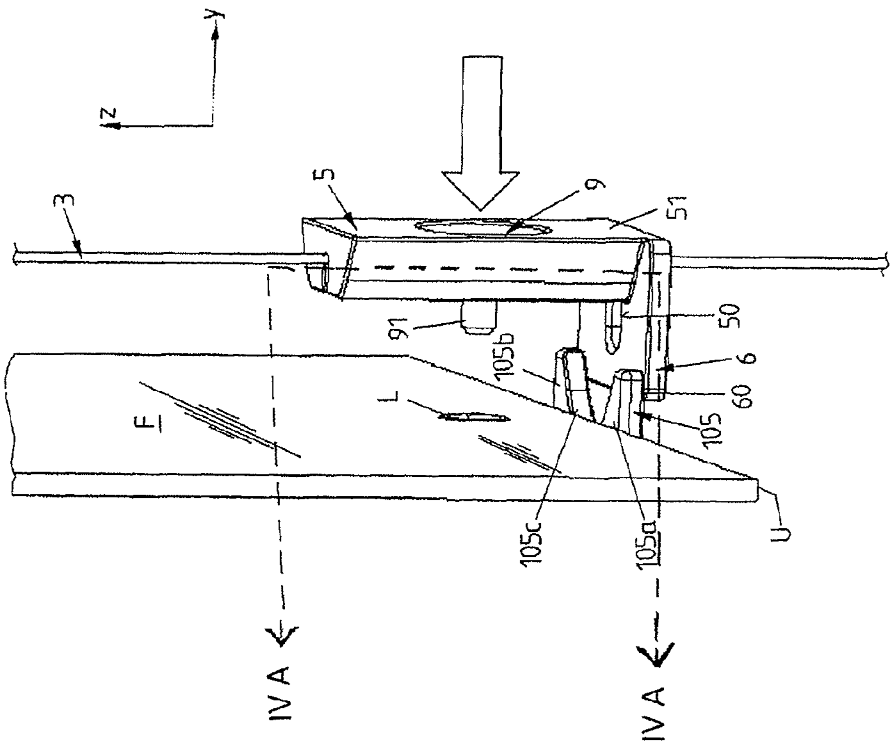
Figure 4D:
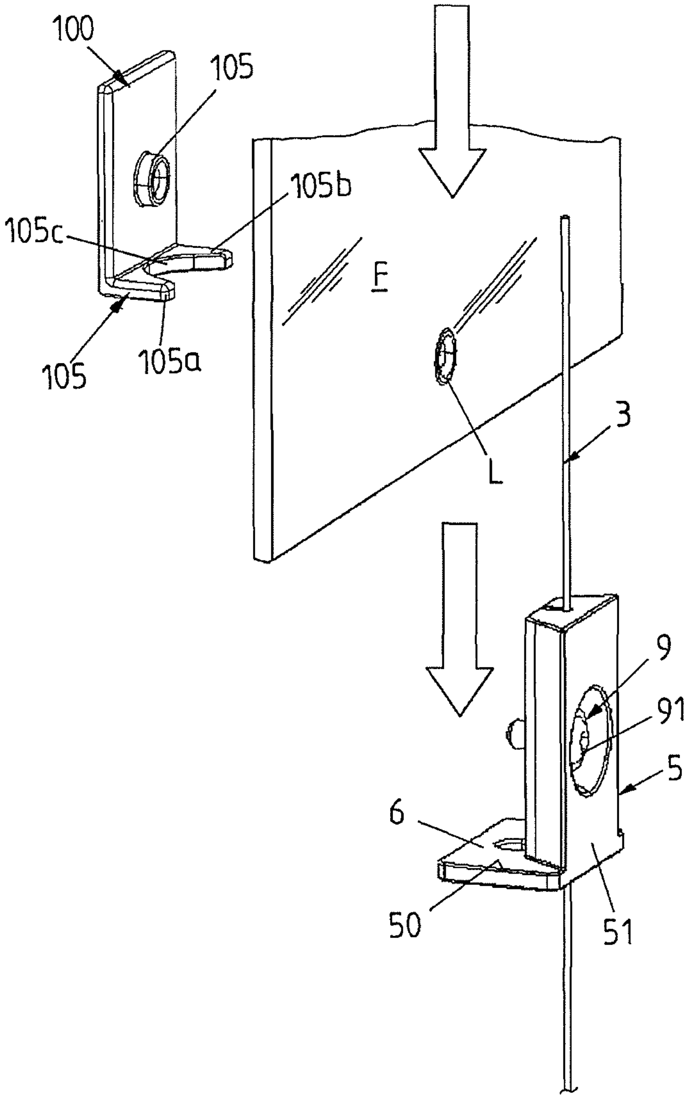
Figure 4E:
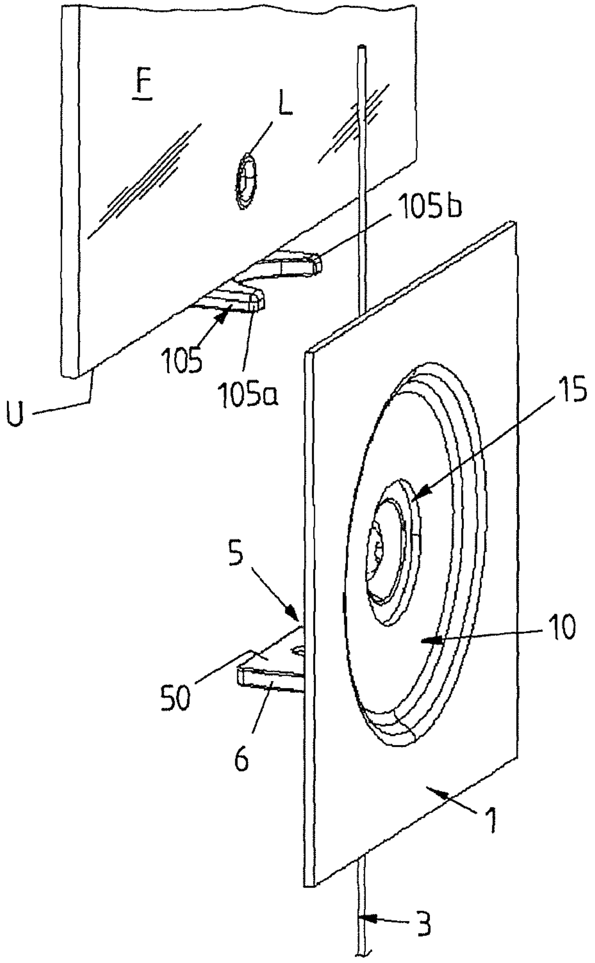
Figure 4F:
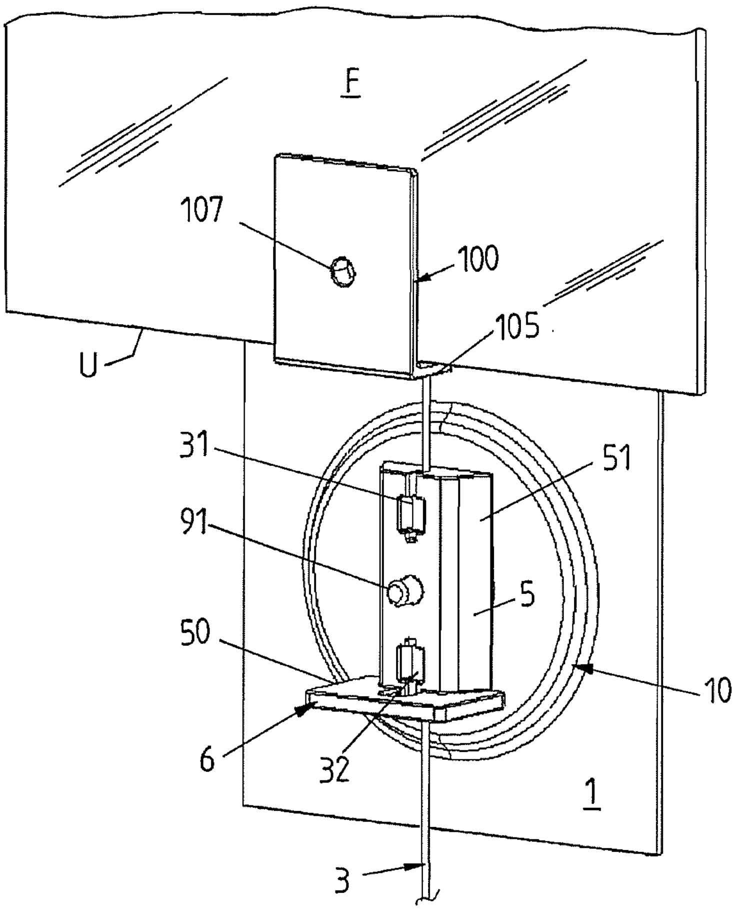

Hereby, the FIGS. 4A to 4F relate to a first modification of the arrangement of FIG. 3A. FIG. 4A is therein a sectional view corresponding to FIG. 3A and FIG. 4B is a corresponding perspective illustration in the assembly position of the carrier 5, wherein the window pane F has already been lowered to an extension 6 of the carrier 5. FIG. 4C shows the carrier 5 after transfer in its functional position. FIGS. 4D to 4F show the lowering of the window pane F upstream of the FIGS. 4A and 4B in case of a carrier 5 being in the assembly position, whereas FIG. 4D is an explosive illustration and in FIGS. 4E to 4F additionally a part of an aggregate carrier 1 with a holder 10 for the carrier 5 is illustrated.

According to the arrangement of the FIGS. 4A to 4F, the carrier 5 is supported in its assembly position shown in FIGS. 4A and 4B by the corresponding holder 10 or by stops/supporting sections 11*b*, 12*b* formed thereon solely along the horizontal vehicle cross axis y. Since the carrier 5 is however already being tied additionally in its assembly position to the flexible pulling means 3, a sufficient stable positioning of the carrier 5 in its functional position can already be achieved through this. Due to the support of the carrier 5 by the holder 10 along the horizontal vehicle cross axis y, in particular a tilting of the carrier 5 (around an axis in vehicle longitudinal direction x) by the impact of forces can be avoided, which come into effect, when the window pane F or an adapter 100 provided thereon strike the extension 6 of the carrier 5.

The holder 10 is formed according to FIGS. 4A and 4B by a simple supporting surface (of an aggregate carrier 1), at which a stop/supporting section 11*b*, 12*b* for the carrier 5 is defined, wherein one part 11*b* of said carrier is located essentially below the assembly opening 15 and its other part 12*b* is located essentially above the assembly opening 15. The supporting surface forming the holder 10 protrudes thereby in the embodiment in contrast to the other region of the aggregate carrier 1 (along the horizontal vehicle cross axis y) somewhat in direction to the window pane F.

The adapter 100 assigned to the window pane F is here L-shaped, wherein its bended (if looked at along the vertical vehicle axis z its lower) arm 105 engages during lowering the window pane F for the purpose of assembly, as illustrated in the FIGS. 4D to 4F, with the extension 6 of the carrier 5 provided for this purpose, as illustrated by means of FIGS. 4A and 4B.

The bended arm 105 of the adapter is thereby formed such and is positioned vertical to the drawing plane of FIG. 4A (that means along the vehicle longitudinal axis X) at the adapter 100 such that said arm does not collide with the arm 51 of the carrier 5 when transferring the carrier 5 later in its functional position at the window pane F, compare FIG. 4C. According to FIG. 4B, the bended arm 105 comprises for this purposes an indentation 105*c*, which is limited by two arm section 105*a*, 105*b* being spaced apart from each other.

As it becomes apparent by means of FIG. 4A, the adapter 100 reaches through the window hole L with a casing 107, into which the fixing element 91 on the carrier side in form of a screw is screwed into, in order to fix the carrier 5 in its functional position at the window pane F. This can be for instance a self-cutting screw, wherein the thread of said screw produces a corresponding counter-thread during screwing into the casing 107. As an alternative, an internal thread can already be provided at the casing 107 in which the fixing element 91 on the carrier side in form of a screw is screwed.

When transferring the carrier from the assembly position shown in FIGS. 4A and 4B in its functional position at the window pane F shown in FIG. 4C, the flexible pulling means 3 is furthermore deflected out of its original plane E and can be additionally tightened, so that said pulling means has then the tension intended during the operation of the window lifter.

Figure 4G:
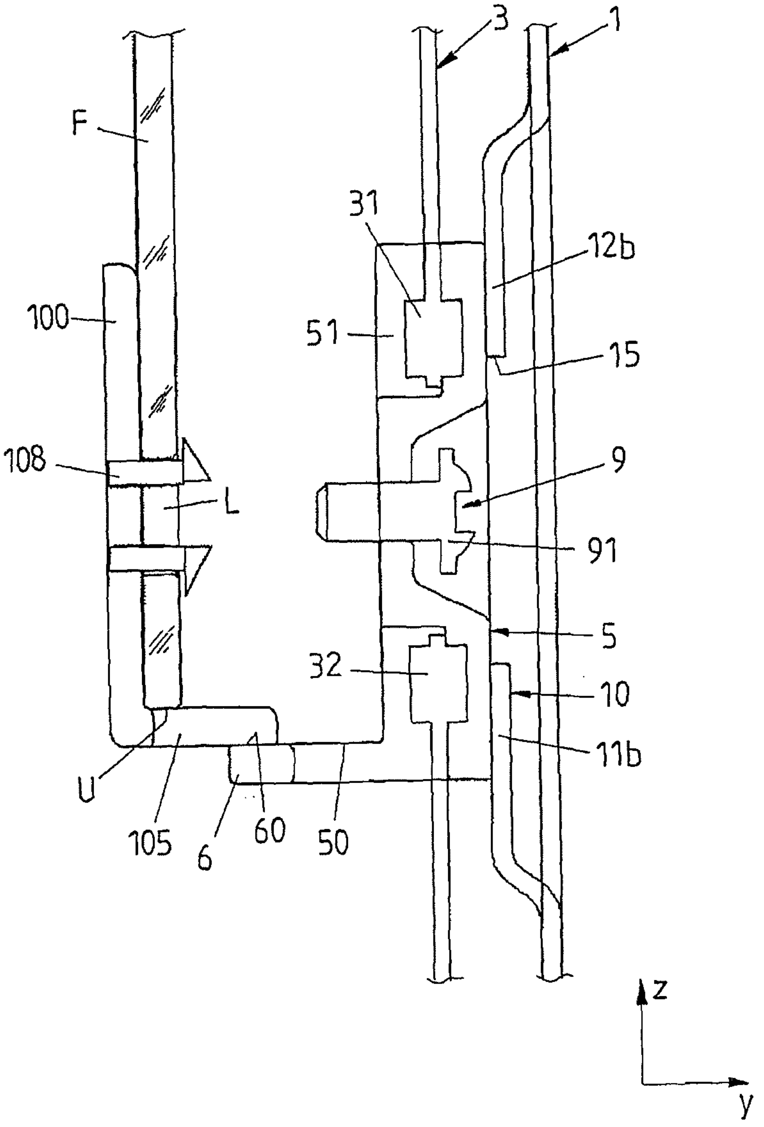

The embodiment illustrated in FIG. 4G differs from the arrangement according to the FIGS. 4A to 4F in that an expansion plug 108 is provided at the adapter 100, which engages to the window hole L and which can be expanded when screwing the fixing means 91 on the carrier side in form of a screw. At present the expansion plug 108 comprises furthermore clipping elements by means of which said plug can be snapped at the edge of the window hole L at the window pane F so that through this simultaneously the adapter 100 is also kept (form fit) at the window pane F.

Figure 4H:
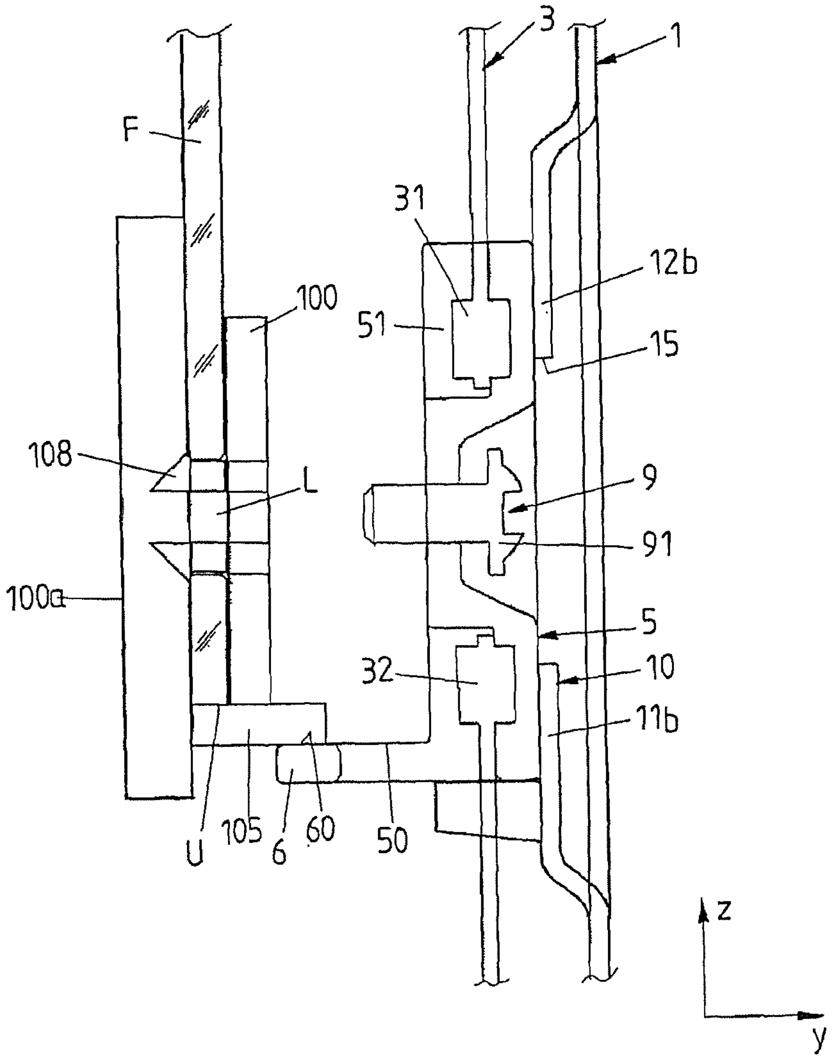
Figure 41:
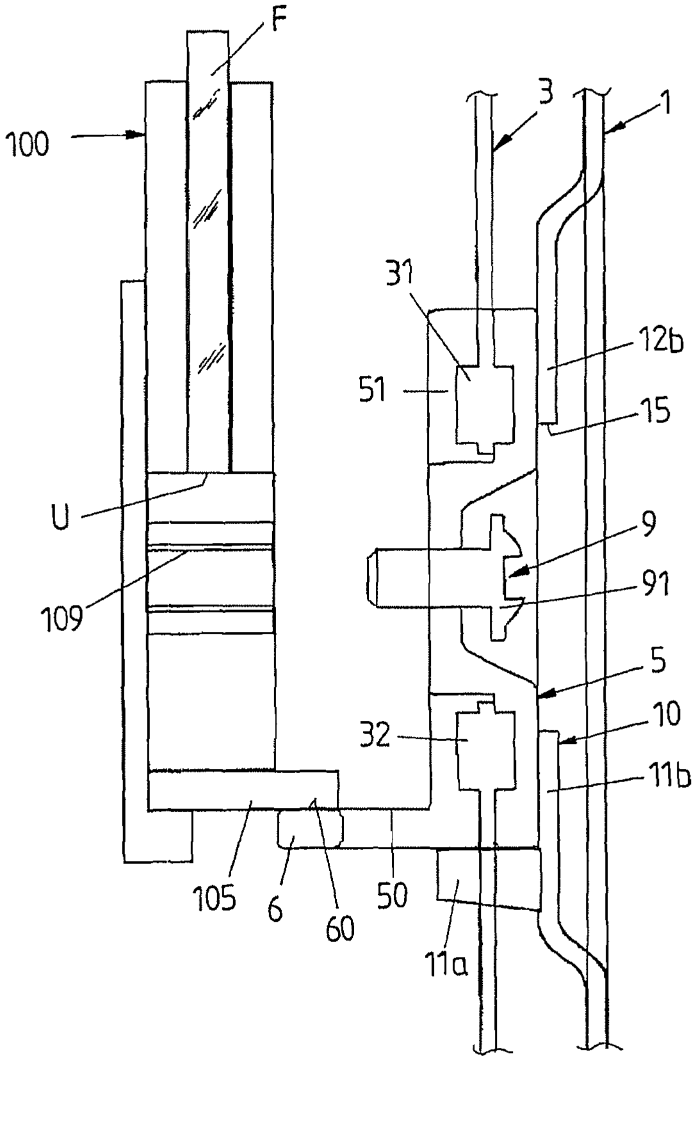

FIG. 4H shows a modification of the embodiment of FIG. 4G according to which the adapter 100 is essentially T-shaped and is located in front of the surface of the window pane F facing the carrier 5, while said adapter in case of FIGS. 4A to 4F and 4G is arranged in each case in front of the surface of the window pane F facing away from the carrier 5.

Additionally, a further component 100A is here arranged on the surface of the window pane F facing away from the carrier 5, which at first can be seen as a part of the adapter and which serves after fixation of the carrier 5 to the window pane F via the fixing means 91 on the carrier side in form of a screw and via the casing 108 on the window side at the same time as a second carrier arm so that the window pane F is housed between the first carrier arm 51 and the said second carrier arm 100A.

Furthermore, according to FIG. 4H—in contrast to the arrangement of the FIGS. 4A to 4F and 4G—an additional support 11A for the carrier 5 is provided at the holder 10 in a direction opposite to the vertical vehicle axis z.

In the embodiment of FIG. 4I an adapter is provided being arranged at the window pane F, which encompasses the window pane F in the area of its lower edge U and which can be in particular connected by gluing to the latter one.

The adapter 100 has a threaded hole 109 with an internal thread below the window lower edge U, into which the fixing element 91 on the carrier side in form of a screw can be screwed in order to fix the carrier at the window pane F.

Figure 5A:
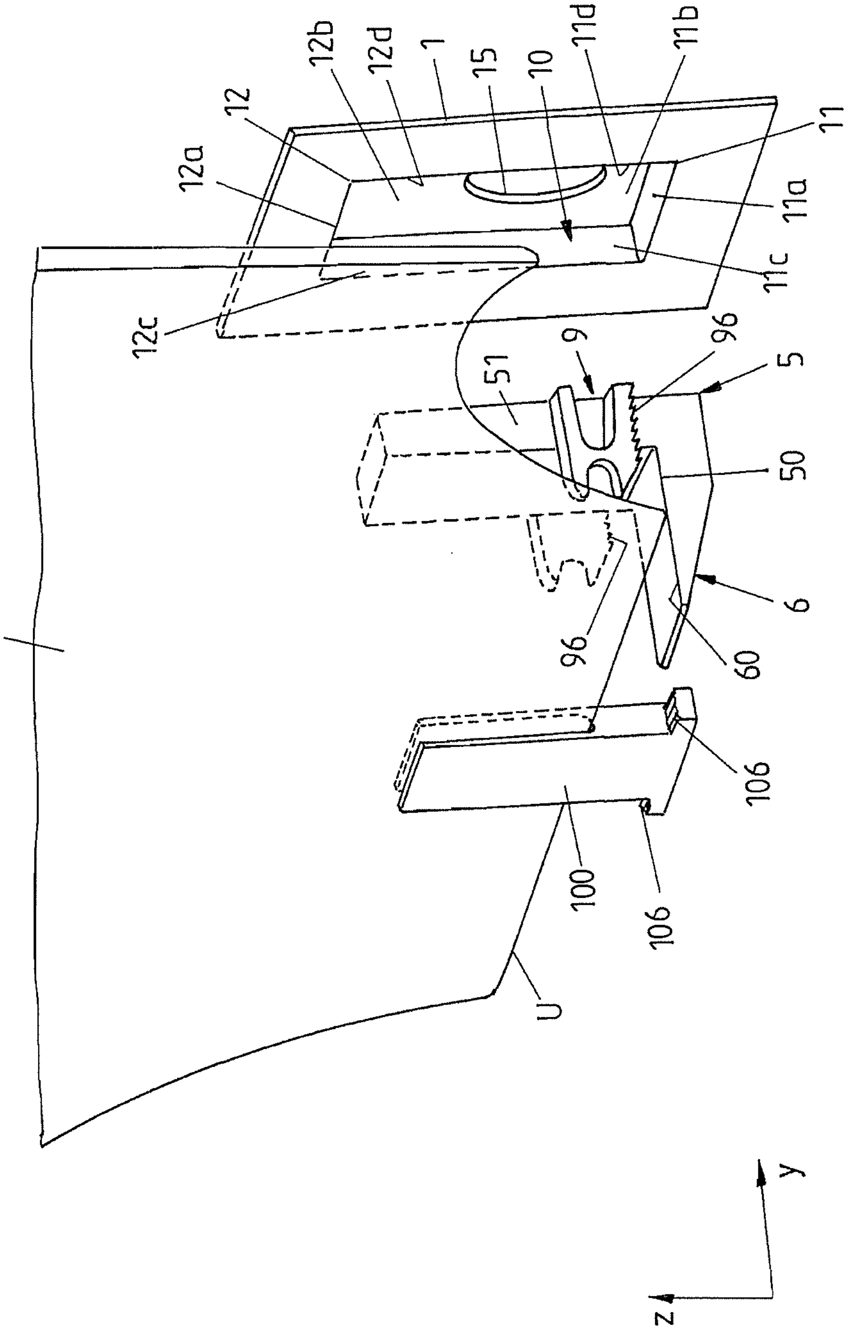

In FIG. 5A, a section of a door module carrier 1 with a holder 10 for a carrier 5 together with the carrier 5 as well as the window pane F with an adapter 100 arranged in the region of its lower edge U is illustrated in an explosive illustration.

The holder 10 is thereby adapted in its (in the embodiment rectangular shaped) contrary to the outer contour of the carrier 5, in particular an arm 51 of the carrier 5 such that the carrier 5 can be housed via its arm 51 form-locked in the holder 10, wherein said carrier can then be supported by the stops 11*a*, 11*b*, 11*c*, 11*d* and 12*a*, 12*b*, 12*c*, 12*d* formed by the holder 10 along five spatial directions, namely along the vertical vehicle axis z upwards and downwards, along the vehicle longitudinal axis x towards the front and towards the back as well as the horizontal vehicle cross axis y in a direction away from the window pane F.

For fixing the carrier 5 to the window pane F, two snap areas 96 in form of toothing areas of the carrier 5 are provided as fixing elements 9, which—being spaced apart from each other along the vehicle longitudinal axis x—stick out from the carrier 5, more precisely from its arm 51, and can be brought into engagement with an assigned opposite toothing 106 of an adapter 100 arranged in the area of the lower edge U of the window pane F, compare also FIG. 5B.

The arrangement of the FIGS. 5A and 5B is shown in the FIGS. 5C and 5D after the window pane is being captured by the extension 6 of the carrier 5 during lowering along its adjustment path for the purpose of assembly and subsequently the carrier 5 is being transferred to its functional position in respect to the window pane F. The FIGS. 5C and 5D show also the arrangement of the carrier 5 in respect to the window pane F and the adapter 100 in the functional position. Hereby, the fixing elements 9 on the carrier side in form of a snap toothing 96 are in engagement with the corresponding opposite toothing 106 at the adapter 100.

Furthermore, the window pane F—via the adapter 100—rests against the corresponding arm 51 of the carrier 5 and the window lower edge U is opposite to a bottom area 50 of the carrier 5, which is adjacent to its extension 6 crosswise to the adjustment path V of the window pane F, compare FIG. 2 (that means along the horizontal vehicle cross axis y). Thereby, the window pane F does not rest directly against said bottom area 50 with its window edge U but rather via the adapter 100. The protrusions of the carrier 5 provided with the snap toothing 94 are housed between the window lower edge U and the protrusions of the adapter 100 provided with the opposite toothing 106, whereby the snap toothing 96 on the carrier side and the opposite toothing 106 on the window side are brought into engagement with each other.

In case of the embodiments previously explained by means of the FIGS. 2 to 5D, the extension 6 sticks out in each case rigidly from the corresponding carrier 5 and extends thereby essentially vertical to the adjacent path V of the assigned window pane 5, compare in particular FIG. 2. By means of the FIG. 6A to 8B subsequently different embodiments with an extension 7 provided movably at the carrier 5 will be explained.

Figure 6A:
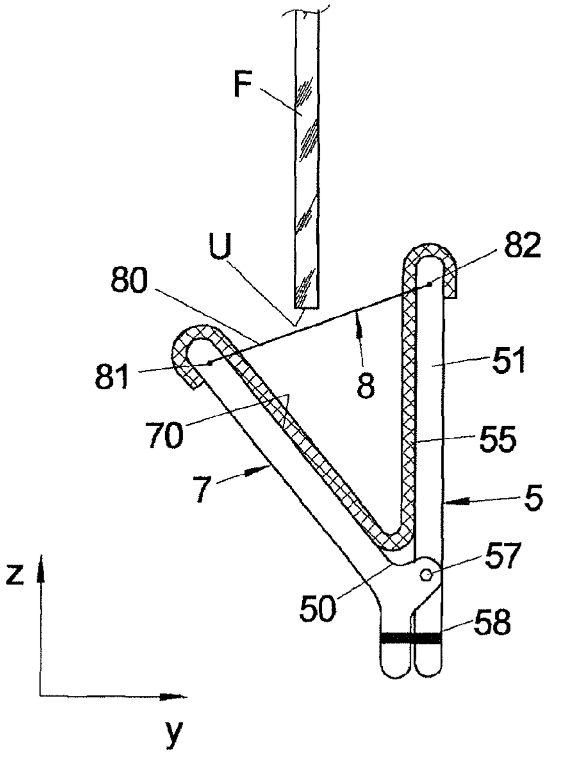
FIG. 6A shows a schematic sectional view of a carrier with a pivoted mounted extension.

According to FIG. 6A, a carrier 5 comprises as base body an arm 51 at which an extension 7 (via a storage position 57 in form of a hinge) is foldable hinged, wherein the carrier 5 and the extension 7 are kept amongst others via an elastic retaining element 58, for instance in form of an elastic ring, in the pivoted position illustrated in FIG. 6A, in which the extension 7 is folded in respect to the carrier 5 outwardly such that the extension 7 projects into the adjustment track of the window pane F to be lowered for assembly purposes. The carrier 5 and the extension 7 are furthermore connected in the area of its upper end facing the window pane F to be lowered via a trigger element 8, here in form of a rope 80, connected to each other, which is fixed at a first fixing location 81 to the extension 7 and at a second fixing location 82 to the carrier 5. The trigger element 8 supports the elastic retaining element 58 in keeping the extension 7 in the tilted position in respect to the carrier 5, illustrated in FIG. 6A, in which the extension 7 projects into the adjustment track of the window pane F to be lowered. The extension 7 continues thereby in an acute angle tilted to the adjustment track V or the window pane F being in the adjustment path V.

Figure 6B:
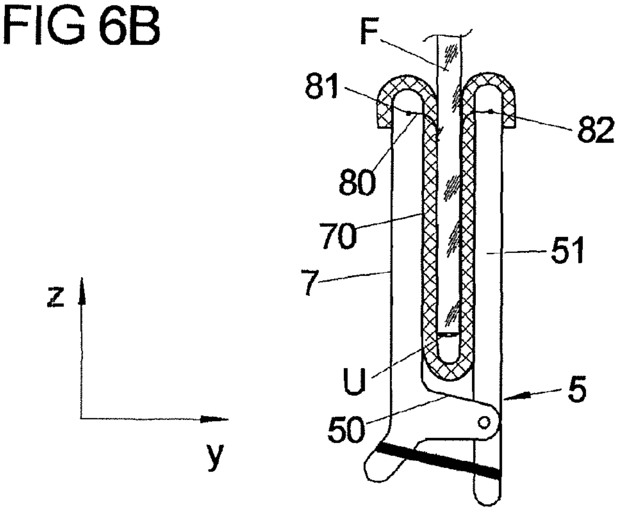
FIG. 6B shows the carrier of FIG. 6A after pivoting the extension towards the window pane to be adjusted.

Furthermore, the carrier 5, more precise one of its arms 51, as well as the extension 7 are provided on their inner surface with a damping insert 55 (for instance of rubber) via which the carrier 5 or its one arm 51 and the extension 7 will rest finally against a respective lateral surface of the window pane F, compare FIG. 6B.

When lowering the window pane F along its adjustment path, said window pane as indicated in FIG. 6A strikes the extension 7, more precise the inner sliding surface of the extension 7 or the part of the internal rubber insert 55 of the carrier 5 continuing there.

Before the window pane F strikes during lowering however (via its window lower edge U) the extension 7 or the local area of the insert 55, said window pane acts at first onto the trigger element 8 in form of a rope 80 and takes along its central section, through which a folding movement of the extension 7 around the bearing position 57 is triggered and the extension 7 is folded increasingly in direction to the opposing arm 51 of the carrier 5, while the carrier 5 and the window pane F are transferred along the transition region 70 of the extension 7 from the assembly position illustrated in FIG. 6A into the functional position shown in FIG. 6B.

The assembly position of the carrier 5 in respect to the window pane F shown in FIG. 6A is thereby characterized in that the window pane F being on the adjustment path V, if looked at along its adjustment path, opposes the pivoted or folded extension 7 of the carrier, while the carrier 5 rests in the functional position shown in FIG. 6B with its arm 51 being originally outside of the adjustment path of the window pane now against the surface of the window pane F.

In the functional position shown in FIG. 6A, the carrier 5 is thereby located, as explained by means of the previous embodiments, at first in an assigned holder, from which said carrier moves while transferred into the functional position shown in FIG. 6B in direction to the window pane F.

This advancing of the carrier 5 to the window pane F occurs in the embodiment of the FIGS. 6A and 6B automatically, while during sliding of the window pane F along the transition region 70 of the extension 7, the extension 7 is pivoted in direction to the opposing arm 51 of the carrier 5.

In the final functional position, as deducible by means of FIG. 6B, the window pane F is finally housed between the one arm 51 of the carrier 5 and the extension 7 folded thereto in a clamping manner. The extension 7 serves then as a second arm of the carrier 5, which affects together with its first arm 51 a clamping housing of the window pane F via the insert 55.

Additionally, a firmly bonded connection between carrier and window pane can here be provided, by for instance providing the insert 55 with adhesive means directly before assembly.

Figure 7B:
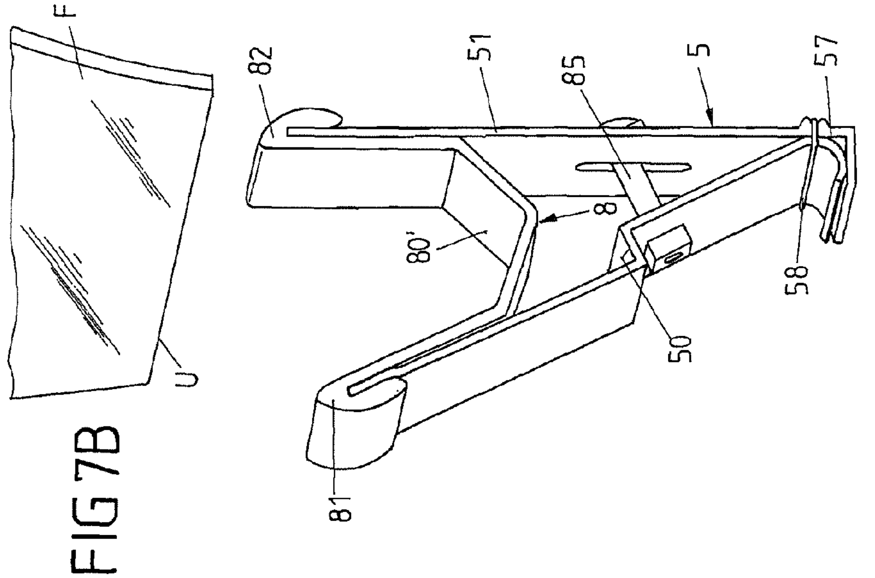
FIG. 7B shows the carrier of FIG. 7A in a perspective view.
Figure 7A:
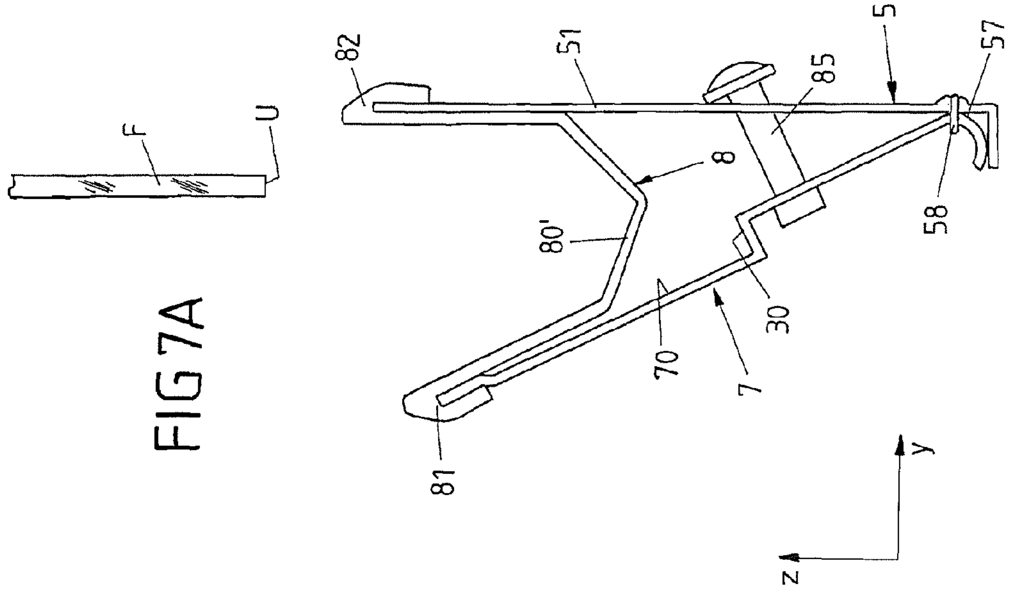
FIG. 7A shows a modification of the carrier of FIG. 6A.

In the FIGS. 7A and 7B, a modification of the arrangement of FIG. 6A is illustrated in a schematic cross sectional view and a perspective view, wherein an essential difference consist in that according to FIG. 7A and 7B the trigger element 8 is formed by an (elastic or plastic) deformable element 80', which on one side is fixed at position 81 at the extension 7 and on the other side at position 82 to the carrier 5. The trigger element 8 serves here simultaneously as insert via which the carrier arm 51 and the extension 7 can rest against a surface of the window pane F, respectively.

Furthermore, an tension fastener element 85 in form of a screw with an assigned nut is provided via which the carrier 5 or more precise its one arm 51 and the extension 7 can be tensioned against each other, if the carrier 5 takes up its (not illustrated in the FIG. 7A and 7B) functional position in respect to the window pane F and, as previously explained by means of FIG. 6B, is housed between the said carrier arm 51 and the extension 7 in a clamping manner.

Figure 8B:
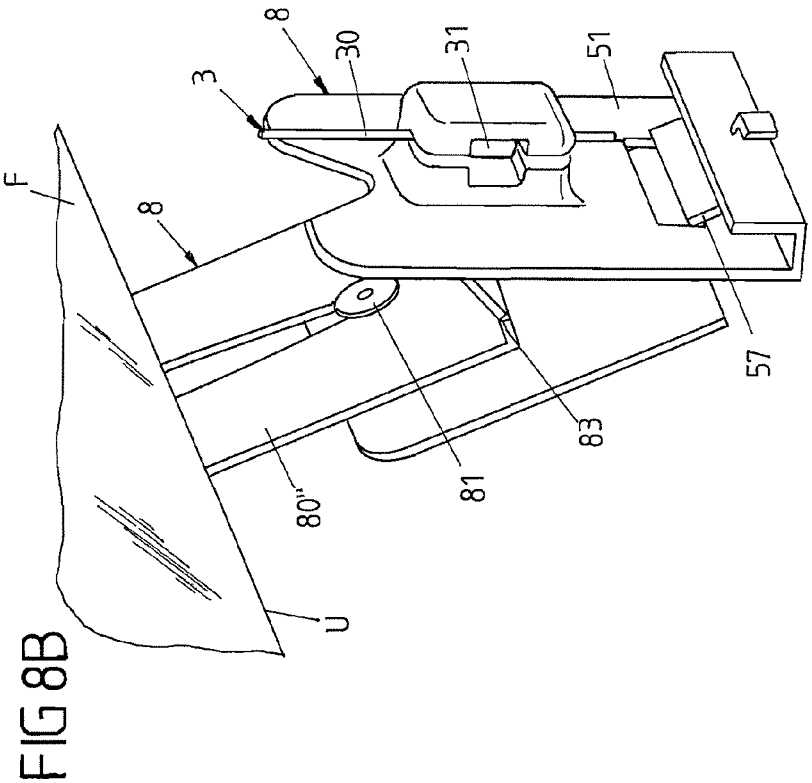
FIG. 8B shows the carrier of FIG. 8A in a perspective view.
Figure 8A:
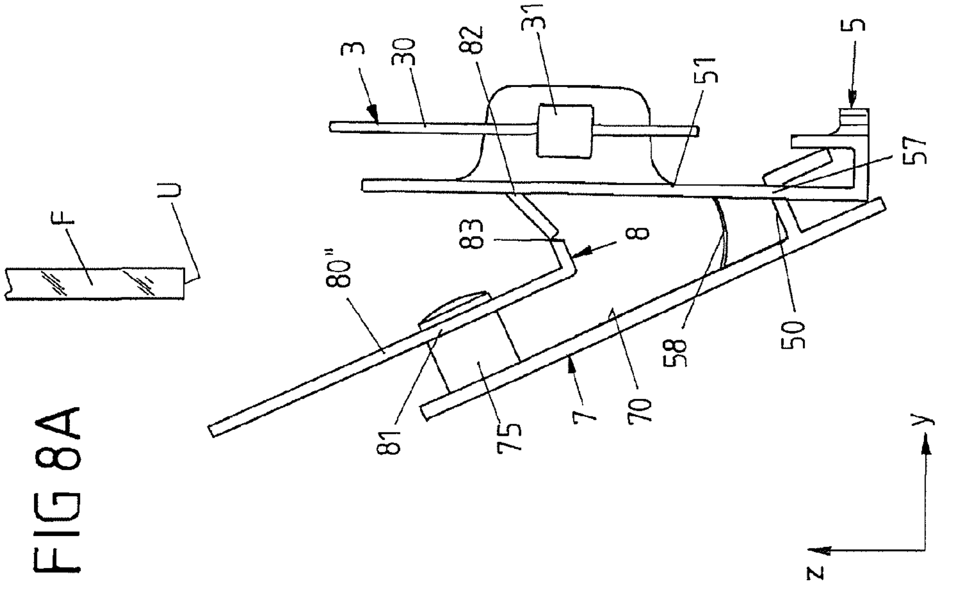
FIG. 8A shows a further modification of the carrier of FIG. 6A.

In the FIGS. 8A and 8B a further modification of the arrangement from FIG. 6A is illustrated, in which a trigger element 8 serves simultaneously as insert for the window pane F in its (not illustrated in the FIGS. 8A and 8B) functional position. The trigger element 8 comprises here a hinge 83 in form of a film hinge in order to trigger during the impact of the window pane a folding of the extension 7 towards the opposing arm 51 of the carrier 5.

The trigger element 8 which serves at the same time as insert, here in form of a longitudinal element 80" equipped with a hinge, is thereby at present guided movably at the fixing area 81 at the side of an extension pin 75 of the extension 7 so that it can be docked at the transition region 70 of the extension 7, while the window pane F acts thereon.

Figure 9:
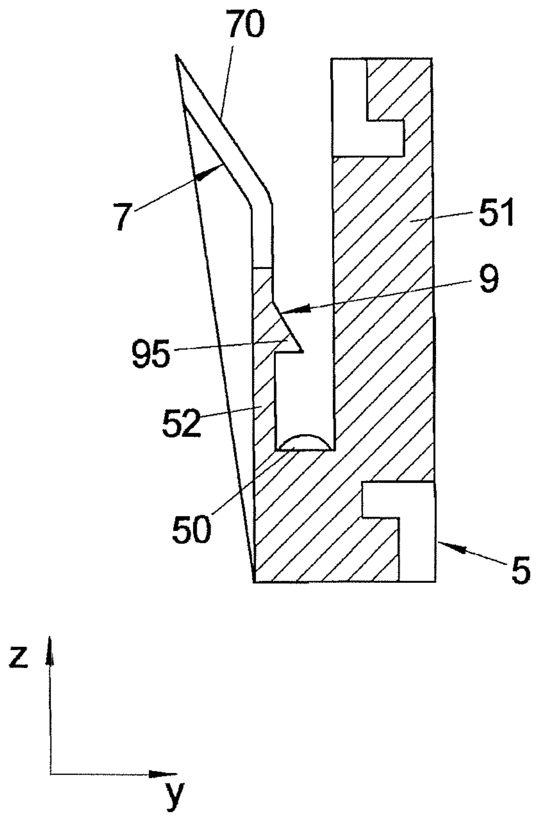
FIG. 9 shows an additional modification of the carrier of FIG. 6A.

In FIG. 9 finally an embodiment of a carrier 5 is illustrated, wherein the extension 7 of said carrier continues on one hand tilted to the adjustment path V of an assigned window pane F as well as to the window pane F itself and wherein the extension 7 of said window pane is on the other hand essentially rigidly connected to the carrier 5, that means it cannot be folded towards the inserted window pane.

The carrier 5 comprises at present two carrier arms 51, 52 opposing each other of which the one arm 51 opposes the extension 7 and the other arm 52—if looked at along the vertical vehicle axis z—is adjacent upwards to the extension 7. At said second arm 52 of the carrier 5 a snap element 95 is provided as a fixing element 9, which can engage in the functional position of the carrier 5 in respect to the window pane F in a window hole provided in the area of the lower edge U of the window pane F.

Furthermore, a damping element is arranged at the bottom area 50 of the carrier 5, which opposes in the functional position of the carrier 5 the lower side U of the window pane F.

Figure 10A:
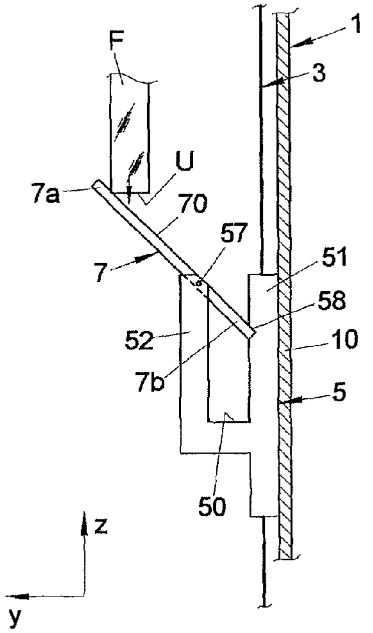
FIG. 10A shows a modification of the arrangement of FIG. 6A with a carrier being in its assembly position.

FIG. 10A shows a further embodiment of the carrier with a pivotably stored extension 7, wherein the carrier 5 is formed essentially U-shaped in its area housing the assigned window pane F.

The carrier 5 rests via a first arm 51 in the assembly position shown in FIG. 10A against a holder 10, which is formed here by a supporting area of an aggregate carrier 1 and which can support the carrier 5 (via the said first arm 51) along the horizontal vehicle cross axis y.

A second arm 52 of the carrier 5 opposes the first carrier arm 51 and is spaced apart from said arm along the horizontal vehicle cross axis y. In case of a carrier 5 arranged as intended at the window pane F, said window pane is being housed in the area of its window lower edge U between the two arms 51, 52 of the carrier 5, wherein the window lower edge U opposes the bottom area 50 of the carrier 5 connecting the two arms 51, 52.

The extension 7 is at present pivotably mounted at the carrier 5, more precise in the embodiment at its second carrier arm 52 such that at the extension 7 to lever arms 7*a*, 7*b* are formed on both sides of the storage position 57.

In the starting position shown in FIG. 10A, in which the carrier 5 is in its assembly position and is not yet fixed to the assigned window pane F, the extension 7 continues tilted to the vertical vehicle axis z, wherein the one lever arm 7*a* of the extension 7 projects into the adjustment path of the window pane F to be lowered for assembly purposes and the second lever arm 7*b* interacts with a carrier side stop 58 in order to keep the extension 7 in the pre-set pivotal position with a defined inclination.

If the window pane F strikes when lowered for assembly purposes as illustrated in FIG. 10A, the first lever arm 7*a* of the extension 7, then the extension 7 is kept at first due to the interaction of its second lever arm 7*b* with the carrier side stop 58 in the pre-set pivoted position, and window pane F and carrier 5 carry out a relative movement towards each other along the transition region 70 at the extension 7. Hereby, the carrier 5 moves (with additional tensioning of the flexible pulling means 3) out of its assembly position at the holder 10 along the horizontal vehicle cross axis y in direction towards the window pane F, according to the transition of FIG. 10A to FIG. 10B.

Figure 10B:
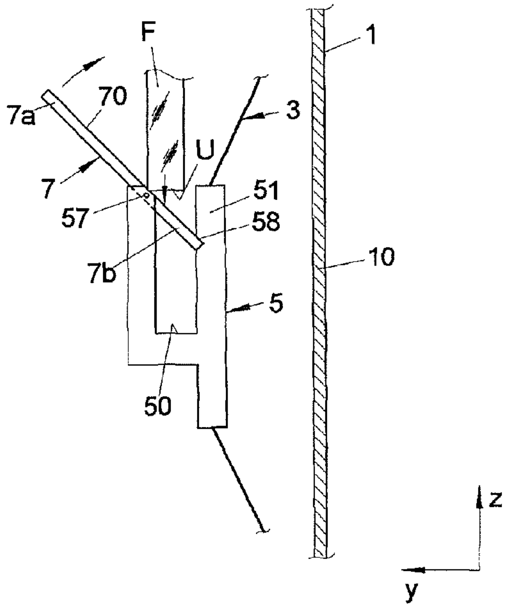
FIG. 10B shows the arrangement of FIG. 10A during the transition of the carrier from its assembly position into its functional position.

During the relative movement of carrier 5 and window pane F along the transition region 70 of the extension 7, the window pane overrides finally the storage position 57 via which the extension 7 is pivotably mounted at the carrier 5 so that the window pane F starts then to act (via its lower edge U or a window adapter provided in the area of the lower edge U) onto the second lever arm 7*b* of the extension 7, as illustrated in FIG. 10B. Through this the direction of the torque acting at the extension 7 turns and said extension is folded around its storage position 57 towards the surface of the window pane F facing away from the aggregate carrier 1, wherein the window pane F moves into the receiving area between the two arms 51, 52 of the carrier 5, according to the transition from FIG. 10B to FIG. 10C.

Due to the modification of the extension 7 with two lever arms 7*a*, 7*b*, the first lever arm 7*a* serves therefore for defining a transition region 70, along which the carrier 5 can slide from its assembly position towards the window pane F, namely automatically by the impact of the window pane F (via its lower edge U or a window adapter) onto said first lever arm 7*a*. Hereby the flexible pulling means 3 is simultaneously increasingly tightened.

Before reaching the functional position of the carrier 5 at the window pane F, the window pane (via its lower edge U or an adapter) comes to bear against the second lever arm 7*b* of the extension 7, through which automatically the pivoted movement of the extension 7 is triggered and said extension is folded towards the window pane F. Through this the window pane F can freely glide into the receiving area of the carrier 5 (between its two arms 51, 52). The complete assembly process continues automatically, that means by the impact of the window pane F onto the extension 7 (directly or indirectly via an adapter) and due to the forces acting hereby.

Figure 10C:
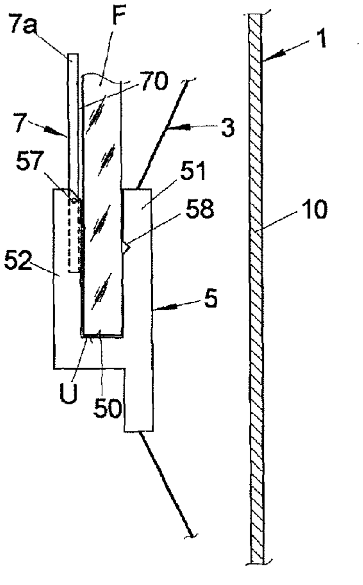
FIG. 10C shows the arrangement of FIG. 10A after reaching the functional position of the carrier.
Figure 11A:
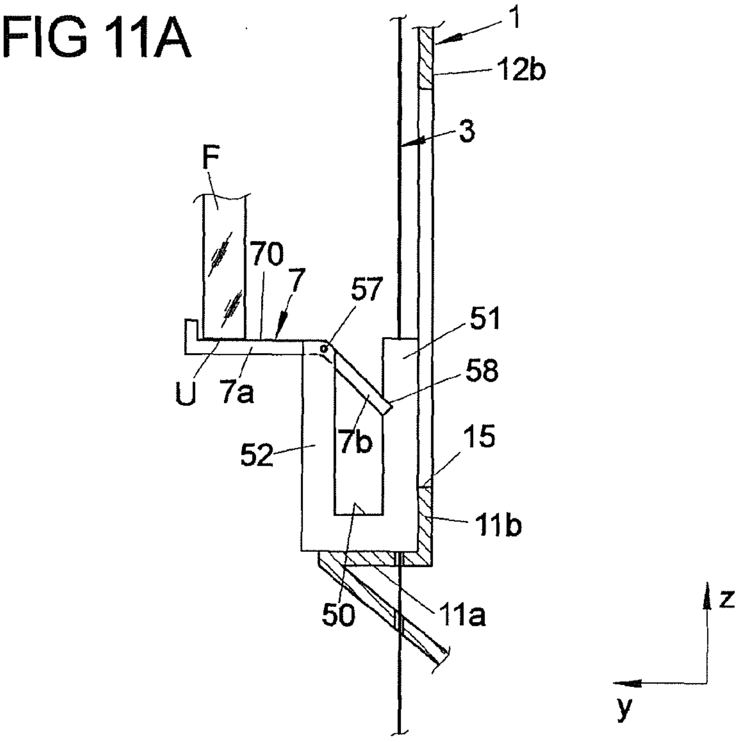
FIGS. 11A-11C show a variant of the arrangement of the FIGS. 10A to 10C.
Figure 11B:
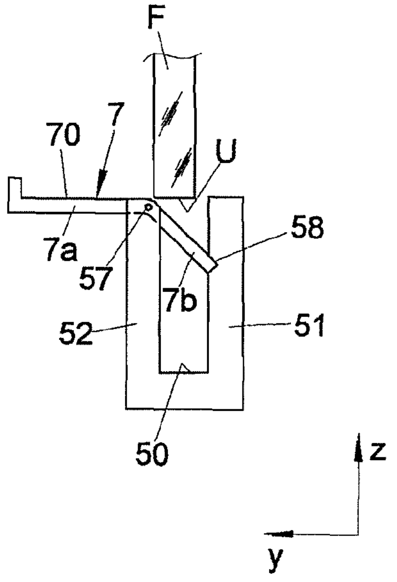
Figure 11C:
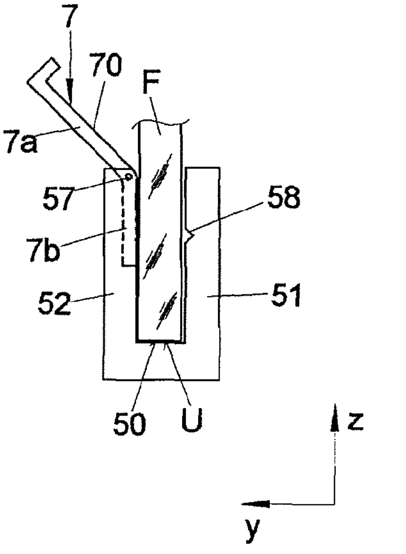

In FIGS. 11A to 11C a modification of the embodiment of the FIGS. 10A to 10C is illustrated, wherein the essential differences consist in the spatial orientation of the first lever arm 7*a* of the extension 7 as well as in the support of the carrier 5 by the assigned holder.

The first lever arm 7*a* of the extension 7 sticks out in the starting position, in which said arm is available for capturing the window pane being movable along its adjustment path for assembly purposes, essentially vertical to the vertical vehicle axis z or to the adjustment path of the window pane F to be adjusted from the carrier 5; that means the arm extends essentially along the horizontal vehicle cross axis y.

Furthermore, a further stop/supporting section 11*a* is provided here at the holder 10, additionally to the supporting area formed by a surface of the aggregate carrier 1, via which the carrier 5 can be supported downwards in its assembly position along the vertical axis z.

The invention claimed is:

1. A window lifter assembly for a motor vehicle with a cable for transmitting a driving force produced by a window lifter drive to a window pane to be adjusted, a carrier, which is coupled to the cable and to which the window pane is to be fixed so that the window pane is connected to the cable via the carrier, and a guide frame being spaced from the carrier for guiding the window pane along an adjustment path defined by the guide frame, wherein along said adjustment path the window pane is moved together with the carrier if a driving force is applied to the window pane via the cable and the carrier, wherein a movement along the adjustment path is forced on the carrier directly by the window pane being guided on the guide frame without the carrier engaging in addition to its connection to the cable, in a guiding device continuing along the adjustment path;

wherein the window lifter assembly comprises a holder located outside of the adjustment path of the window pane, on which the carrier can be arranged in an assembly position before the carrier is fixed to the window pane, wherein an extension protrudes from the carrier into the adjustment path for capturing the window pane, when the carrier is in its assembly position on the holder, and wherein after capturing the window pane on the extension, the carrier and the window pane are movable with respect to each other in a direction having a directional component substantially perpendicular to the adjustment path from the assembly position into a functional position being different from the assembly position, in which said carrier is fixed to the window pane.

2. The window lifter assembly according to claim 1, wherein the adjustment path extends between a first end and a second end and wherein in the assembly position the carrier is between and spaced from the first and second ends.

3. The window lifter assembly according to claim 2, wherein the location at which the carrier is positioned in the assembly position when arranged on the holder is spaced from each of the first and second ends of the adjustment path by a length which corresponds to at least 20% of a distance between the first and second ends.

4. The window lifter assembly according to claim 1, wherein in the functional position, the window pane engages with the extension of the carrier.

5. The window lifter assembly according to claim 4, wherein the extension comprises a transition region along which the carrier and the window pane are movable relative to each other in order to move the carrier from the assembly position into the functional position.

6. The window lifter assembly according to claim 4, wherein in the assembly position the carrier is located in a first position with respect to the window pane, and in the functional position, the carrier is located in a second position with respect to the window pane, the second position being spaced from the first position along a path generally transverse to the adjustment path.

7. The window lifter assembly according to claim 5, wherein the transition region extends generally transverse to the adjustment path.

8. The window lifter assembly according to claim 5, wherein the transition region extends tilted at an acute angle with respect to the adjustment path.

9. The window lifter assembly according to claim 8, wherein due to the tilted transition region a movement of the window pane along the adjustment path can be converted into a movement transverse to the adjustment path in order to transfer the carrier from the assembly position into the functional position.

10. The window lifter assembly according to claim 8, wherein the extension is movably connected to the carrier.

11. The window lifter assembly according to claim 10, wherein the extension is connected to the carrier such that the extension can be moved during a movement of the window pane with respect to the carrier towards a surface of the window pane.

12. The window lifter assembly according to claim 10, wherein the window pane is housed in the functional position of the carrier between the extension and a further arm of the carrier.

13. The window lifter assembly according to claim 10, wherein a trigger element is located at the extension via which the extension is in contact with the carrier and which is configured to pivot the extension when said window pane engages with the extension.

14. The window lifter assembly according to claim 5, wherein the window pane rests against the transition region via its lower edge or via an adapter arranged proximate the lower edge when the carrier is being transferred from the assembly position into the functional position.

15. The window lifter assembly according to claim 1, wherein in the assembly position, the extension of the carrier protrudes from the carrier to a distance that allows said carrier to capture the window pane being moved along the adjustment path while said carrier is spaced from the window pane.

16. The window lifter assembly according to claim 1, wherein the extension is located at the carrier such that the window pane is configured to engage the extension via its lower edge or via an adapter arranged proximate the lower edge when said window pane is moved along the adjustment path for assembly.

17. The window lifter assembly according to claim 1, wherein the holder for the carrier comprises at least one stop, by which the carrier can be supported during assembly of the window pane.

18. The window lifter assembly according to claim 1, wherein the holder is provided at an aggregate carrier to which further components of the window lifter assembly are assembled.

19. The window lifter assembly according to claim 1, wherein the carrier is coupled to the cable while said carrier is arranged at the holder in the assembly position.

20. The window lifter assembly according to claim 1, wherein a fastener is provided at the carrier or at the window pane via which the carrier can be fixed to the window pane.

21. The window lifter assembly according to claim 20, wherein the fastener is selected from fasteners for providing one of the following connections:

a) a bolted connection, b) a rivet connection, c) a detachable connection of at least one expansible element with corresponding expansible means, d) a snap-in connection; or e) a snap-in connection with toothing elements.

22. The window lifter assembly according to claim 20, wherein the fastener can be actuated through an assembling opening of the window lifter assembly.

23. A method for assembling a window lifter assembly for a motor vehicle, the method comprising:

providing a cable for transmitting a driving force produced by a window drive to a window pane to be adjusted, connecting a carrier to the cable via which the window pane is to be connected to the cable, guiding the window pane along an adjustment path in a guide frame being spaced from the carrier, and moving the window pane along the adjustment path defined by the guide frame in order to engage the carrier fixed to the cable and to fix said window pane to said carrier, wherein an extension projects from the carrier;

wherein during the movement of the window pane along the adjustment path, the window pane enagages the extension of the carrier; and wherein after engaging the window pane, the carrier and the window pane are moved with respect to each other in a direction having a directional component substantially perpendicular to the adjustment path from an assembly position at a stationary holder being outside of the adjustment path to a functional position different from the assembly position such that the carrier can be fixed to the window pane.

* * * * *